（12） United States Patent
Tateno

(10) Patent No.: US 9,383,633 B2
(45) Date of Patent: Jul. 5, 2016

(54) ELECTRO-OPTICAL DEVICE AND ELECTRONIC APPARATUS

(71) Applicant: Seiko Epson Corporation, Tokyo (JP)

(72) Inventor: Yoshitake Tateno, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 121 days.

(21) Appl. No.: 14/515,282

(22) Filed: Oct. 15, 2014

(65) Prior Publication Data

US 2015/0116604 A1 Apr. 30, 2015

(30) Foreign Application Priority Data

Oct. 30, 2013 (JP) ................................. 2013-225047

(51) Int. Cl.
| | |
|---|---|
| *G02F 1/1335* | (2006.01) |
| *G03B 21/00* | (2006.01) |
| *G03B 21/132* | (2006.01) |
| *G02F 1/1362* | (2006.01) |
| *H04N 9/31* | (2006.01) |

(52) U.S. Cl.
CPC ........ *G03B 21/006* (2013.01); *G02F 1/136209* (2013.01); *G03B 21/132* (2013.01); *H04N 9/3105* (2013.01); *G02F 1/133504* (2013.01)

(58) Field of Classification Search
CPC ............................. G03B 21/006; G03B 21/132
See application file for complete search history.

(56) References Cited

U.S. PATENT DOCUMENTS

| | | | | |
|---|---|---|---|---|
| 7,768,707 | B2 * | 8/2010 | Kamijima | ......... G02F 1/133526 359/625 |
| 8,833,944 | B2 * | 9/2014 | Katou | .................... G03B 21/14 353/20 |
| 2003/0001986 | A1 * | 1/2003 | Fukuda | ............. G02F 1/133528 349/95 |
| 2006/0176540 | A1 | 8/2006 | Kamijima | |
| 2007/0183016 | A1 | 8/2007 | Kamijima et al. | |
| 2007/0247731 | A1 | 10/2007 | Mizusako | |
| 2011/0140155 | A1 | 6/2011 | Ishii | |

FOREIGN PATENT DOCUMENTS

| | | |
|---|---|---|
| JP | 2006-215427 A | 8/2006 |
| JP | 2007-233378 A | 9/2007 |
| JP | 2007-256593 A | 10/2007 |
| JP | 2007-279089 A | 10/2007 |
| JP | 2009-276711 A | 11/2009 |
| JP | 2011-128292 A | 6/2011 |

* cited by examiner

*Primary Examiner* — Dung Nguyen
(74) *Attorney, Agent, or Firm* — ALG Intellectual Property, LLC

(57) ABSTRACT

A projector includes a polarizing illumination device which supplies light; a liquid crystal device which modulates the light; and a projection lens which projects the modulated light. The liquid crystal device is provided with an element substrate which includes a plurality of pixel electrodes and a light shielding layer; an opposing substrate includes prisms which are formed of vacant grooves which are open toward the light shielding layer; and an liquid crystal layer which is provided between the element substrate and the opposing substrate. A width of the light shielding layer falls within a range of 0.575 μm to 0.625 μm, and when an angle of incidence of the light which is incident on the liquid crystal device falls within a range of 7° to 17°, an F number of the projection lens falls within a range of 1.8 to 2.2.

6 Claims, 10 Drawing Sheets

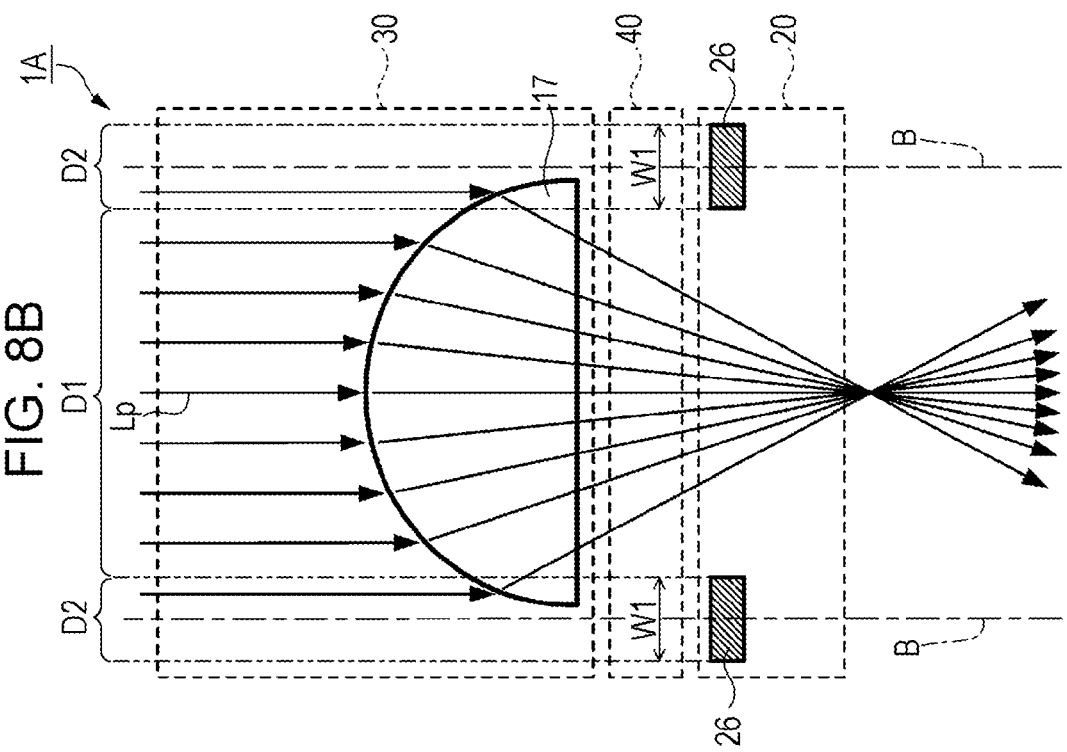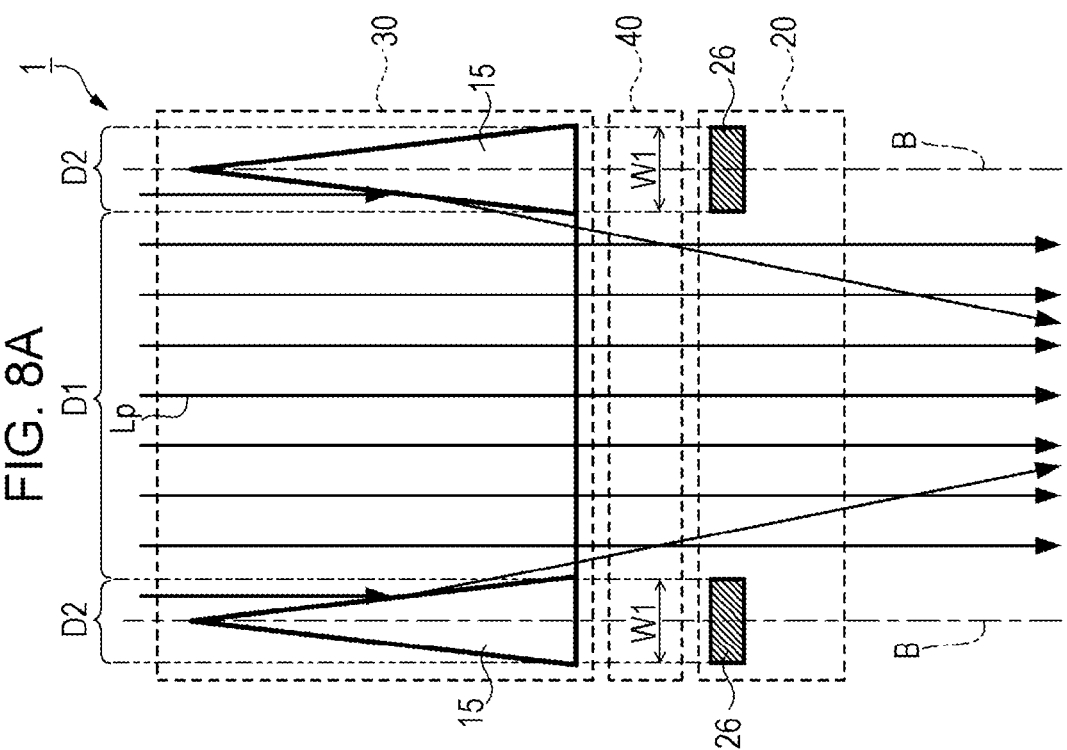

ELECTRO-OPTICAL DEVICE AND ELECTRONIC APPARATUS

BACKGROUND

1. Technical Field

The present invention relates to an electro-optical device and an electronic apparatus.

2. Related Art

There is known an electronic apparatus (a projector) which modulates light which is incident from a light source unit using a light bulb, and projects the modulated light as image light onto a screen using a projection lens. An electro-optical device (a liquid crystal device) provided with an electro-optical material (for example, liquid crystal or the like) between an element substrate and an opposing substrate may be used as the light bulb of the projector, for example. It is desirable that the projector be capable of projecting a brighter image, and there is demand to realize high efficiency for light utilization in the liquid crystal device used as the light bulb.

Therefore, there is proposed a configuration designed to improve the efficiency for light utilization in the liquid crystal device by providing prisms (reflecting portions) on one of the element substrate or the opposing substrate, causing the light which is blocked by a light shielding layer, of the light incident on the liquid crystal device, to reflect on the prisms, and allowing the reflected light to enter opening regions of pixels (for example, refer to JP-A-2007-233378). In the projector disclosed in JP-A-2007-233378, the F number of the projection lens is set to 1.4.

Incidentally, there is a projector referred to as a short-focus projector which is capable of projecting an image of the same size onto a screen from a position closer than normal. A projection lens with an F number of 1.4 or less is not appropriate for the short-focus projector due to great aberration; thus, a projection lens with an F number of 1.5 or greater is used for the short-focus projector. However, since the acceptance angle of the projection lens decreases as the F number of the projection lens increases, the amount of light that is subjected to vignetting by the projection lens (light which is not used) increases, and the brightness of the image is reduced. Therefore, there is demand for a short-focus projector which is capable of displaying a brighter image by reducing the amount of light that is subjected to vignetting by the projection lens while increasing the efficiency for light utilization in the liquid crystal device.

SUMMARY

The invention can be realized in the following forms or application examples.

Application Example 1

According to this application example, there is provided an electronic apparatus which includes a light source unit which supplies light; an electro-optical device which modulates the light which is incident from the light source unit; and a projection lens which projects the light which is modulated by the electro-optical device, in which the electro-optical device is provided with a first substrate which includes a plurality of pixel electrodes and a light shielding layer which is disposed between two adjacent pixel electrodes of the plurality of pixel electrodes; a second substrate which is disposed to oppose the first substrate and includes grooves which are disposed at positions overlapping the light shielding layer in plan view; and an electro-optical material layer which is provided between the first substrate and the second substrate, in which the grooves include inclined surfaces which are inclined in relation to a surface of the second substrate such that a width of opening portions of the grooves is wider at the first substrate side, and in which a width of the light shielding layer falls within a range of 0.575 μm to 0.625 μm, and when an angle of incidence of the light which is incident on the electro-optical device from the light source unit falls within a range of 7° to 17°, an F number of the projection lens falls within a range of 1.8 to 2.2.

According to the configuration of the application example, in the electro-optical device, reflecting portions (prisms) formed of vacant grooves are provided in the second substrate. Therefore, in the electro-optical device, of the light which is incident from the second substrate side, the light that will be blocked by the light shielding layer provided on the first substrate if the reflecting portion is not present is guided into the opening portion of the light shielding layer, thus it is possible to improve the efficiency for light utilization. Here, when the width of the light shielding layer, which is provided in the electro-optical device, falls within a range of 0.575 μm to 0.625 μm, and the angle of incidence of the light which is incident on the electro-optical device from the light source unit falls within a range of 7° to 17°, the F number of the projection lens falls within a range of 1.8 to 2.2. Therefore, by adopting such conditions for the width of the light shielding layer, which is provided in the electro-optical device, and the angle of incidence of the light which is incident on the electro-optical device, it is possible to reduce the amount of light which is subjected to vignetting by the projection lens to a smaller amount than in a case in which the electro-optical device is provided with the micro lenses, even if the F number of the projection lens is great at 1.8 to 2.2. Accordingly, it is possible to obtain a brighter image even if the electronic apparatus is a short-focus projector.

Application Example 2

According to this application example, there is provided an electronic apparatus which includes a light source unit which supplies light; an electro-optical device which modulates the light which is incident from the light source unit; and a projection lens which projects the light which is modulated by the electro-optical device, in which the electro-optical device is provided with a first substrate which includes a plurality of pixel electrodes and a light shielding layer which is disposed between two adjacent pixel electrodes of the plurality of pixel electrodes; a second substrate which is disposed to oppose the first substrate and includes grooves which are disposed at positions overlapping the light shielding layer in plan view; and an electro-optical material layer which is provided between the first substrate and the second substrate, in which the grooves include inclined surfaces which are inclined in relation to a surface of the second substrate such that a width of opening portions of the grooves is wider at the first substrate side, and in which a width of the light shielding layer falls within a range of 0.575 μm to 0.625 μm, and when an angle of incidence of the light which is incident on the electro-optical device from the light source unit falls within a range of 7° to 10°, an F number of the projection lens falls within a range of 1.7 to 2.2.

According to the configuration of the application example, in the electro-optical device, reflecting portions (prisms) formed of vacant grooves are provided in the second substrate. Therefore, in the electro-optical device, of the light which is incident from the second substrate side, the light that will be blocked by the light shielding layer provided on the first substrate if the reflecting portion is not present is guided into the opening portion of the light shielding layer, thus it is possible to improve the efficiency for light utilization. Here, when the width of the light shielding layer, which is provided in the electro-optical device, falls within a range of 0.575 μm to 0.625 μm, and the angle of incidence of the light which is incident on the electro-optical device from the light source unit falls within a range of 7° to 10°, the F number of the projection lens falls within a range of 1.7 to 2.2. Therefore, by adopting such conditions for the width of the light shielding layer, which is provided in the electro-optical device, and the angle of incidence of the light which is incident on the electro-optical device, it is possible to reduce the amount of light which is subjected to vignetting by the projection lens to a smaller amount than in a case in which the electro-optical device is provided with the micro lenses, even if the F number of the projection lens is great at 1.7 to 2.2. Accordingly, it is possible to obtain a brighter image even if the electronic apparatus is a short-focus projector.

Application Example 3

In the electronic apparatus according to the application example, the second substrate includes a sealing layer which covers a surface opposing the first substrate and blocks the opening portions of the grooves, a depth of the grooves falls within a range of 25 μm to 35 μm, a width of the opening portions of the grooves falls within a range of 0.7 μm to 3.0 μm, a thickness of the sealing layer falls within a range of 2 μm to 5 μm, a thickness of the electro-optical material layer falls within a range of 2 μm to 4 μm, and a thickness of the light shielding layer falls within a range of 2 μm to 5 μm.

According to the configuration of the application example, by adopting such ranges for each of the depth of the grooves, the width of the opening portions of the grooves, the thickness of the sealing layer, the thickness of the electro-optical material layer, and the thickness of the light shielding layer, it is possible to reduce the amount of light which is subjected to vignetting by the projection lens to less than in a case in which the electro-optical device is provided with micro lenses while increasing the efficiency for light utilization in the electro-optical device, even if the F number of the projection lens is great.

Application Example 4

According to this application example, there is provided an electro-optical device used in the electronic apparatus according to the application examples described above.

According to the configuration of the application example, it is possible to provide an electro-optical device with high efficiency for light utilization and in which a bright image can be obtained when used in a short-focus projector.

BRIEF DESCRIPTION OF THE DRAWINGS

The invention will be described with reference to the accompanying drawings, wherein like numbers reference like elements.

FIGS. 8A and 8B are schematic views illustrating a comparison of the effects of a prism and a micro lens.

DESCRIPTION OF EXEMPLARY EMBODIMENTS

Hereinafter, the embodiments that embody the invention will be described with reference to the drawings. The drawings used are shown enlarged, reduced, or emphasized such that the portions being described are visually recognizable. There are also cases in which depiction of components other than those necessary for the description is omitted.

Electronic Apparatus

Figure 1:
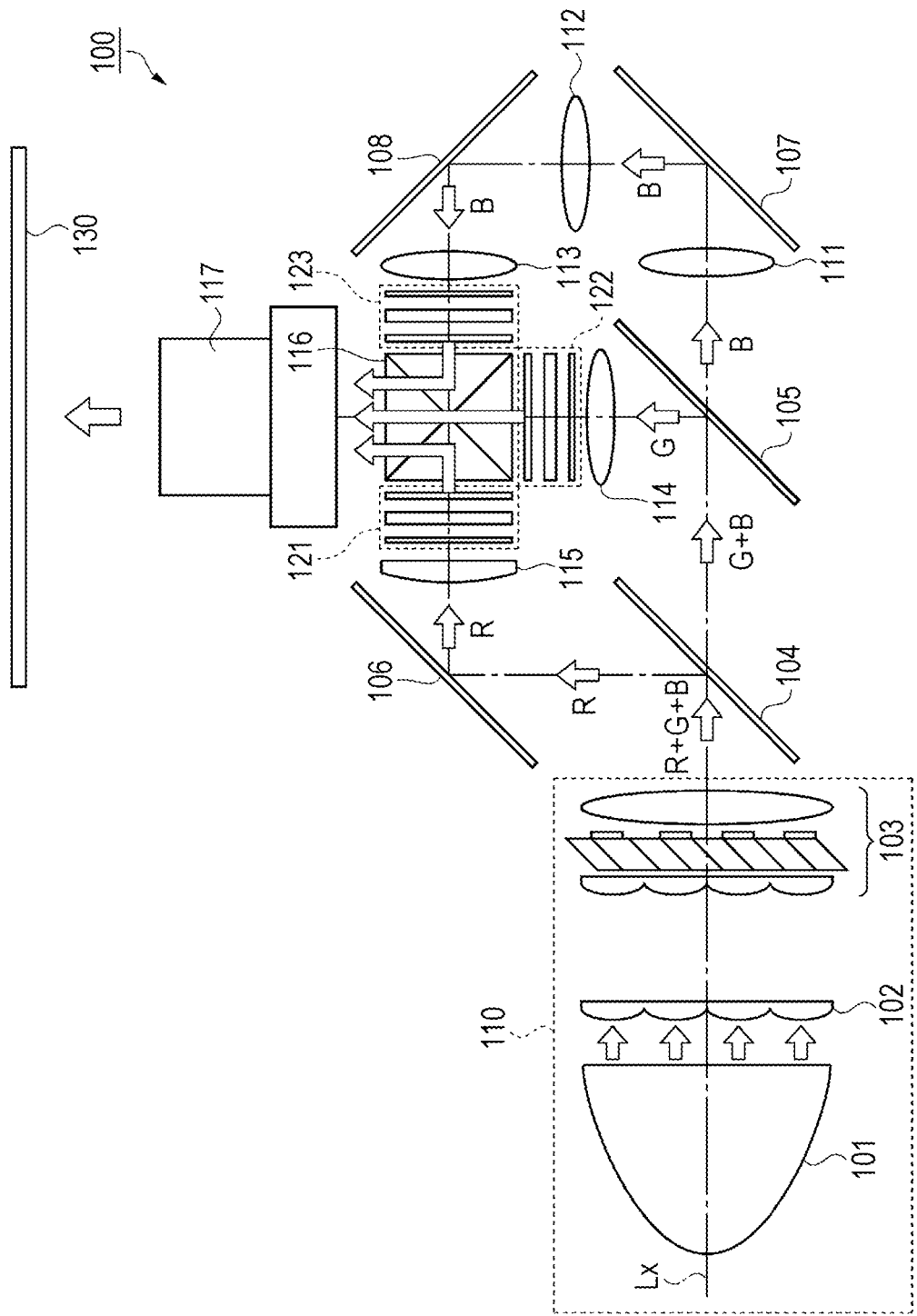
FIG. 1 is a schematic diagram illustrating the configuration of a projector as an electronic apparatus according to the present embodiment.

First, description will be given of an electronic apparatus according to the present embodiment with reference to FIG. 1. FIG. 1 is a schematic diagram illustrating the configuration of a projector (a projection display device) as the electronic apparatus according to the present embodiment. As illustrated in FIG. 1, a projector 100 as the electronic apparatus according to the present embodiment is a projection display device which modulates light incident from a light source unit using a light modulating element and projects the modulated light onto a screen 130 using a projection optical system. The projector 100 according to the present embodiment is a short-focus projector which projects an image onto the screen from a position which is closer than normal.

The projector 100 is provided with a polarizing illumination device 110 as the light source unit, two dichroic mirrors 104 and 105 as light separating elements, three reflecting mirrors 106, 107 and 108, five relay lenses 111, 112, 113, 114, and 115, three liquid crystal light bulbs 121, 122, and 123 as light modulating elements, a cross dichroic prism 116 as a light combining element, and a projection lens 117 as a projection optical system.

The polarizing illumination device 110 is provided with a lamp unit 101 as the light source that is formed of a white light source such as an ultrahigh pressure mercury lamp or a halogen lamp, for example, an integrator lens 102, and a polarization conversion element 103. The lamp unit 101, the integrator lens 102, and the polarization conversion element 103 are disposed along a system optical axis Lx.

Of the polarized luminous flux emitted from the polarizing illumination device 110, the dichroic mirror 104 reflects the red light (R) and transmits the green light (G) and the blue light (B). The other dichroic mirror 105 reflects the green light (G) which is transmitted by the dichroic mirror 104, and transmits the blue light (B).

The red light (R) which is reflected by the dichroic mirror 104 is reflected by the reflecting mirror 106, and is subsequently incident on the liquid crystal light bulb 121 through the relay lens 115. The green light (G) which is reflected by the dichroic mirror 105 is incident on the liquid crystal light bulb 122 through the relay lens 114. The blue light (B) which is transmitted by the dichroic mirror 105 is incident on the liquid crystal light bulb 123 through a light guide system configured of the three relay lenses 111, 112, and 113, and the two reflecting mirrors 107 and 108.

The liquid crystal light bulbs 121, 122, and 123 are transmission light modulating elements, and are applied to a liquid crystal device 1 (refer to FIG. 2A) described later. The liquid crystal light bulbs 121, 122, and 123 are disposed between a pair of polarizing elements to leave gaps therebetween, and the polarizing elements are disposed in a crossed Nicol arrangement at the incidence and the emission sides of the colored light. The liquid crystal light bulbs 121, 122, and 123 are disposed to face each surface of the cross dichroic prism 116 on which the respective colors of light are incident. The colored light which is incident on the liquid crystal light bulbs 121, 122, and 123 is modulated on the basis of image information (an image signal) and is emitted toward the cross dichroic prism 116.

The cross dichroic prism 116 is configured by bonding four right-angle prisms together, and on the inner surface thereof, a dielectric multilayer film which reflects red light and a dielectric multilayer film which reflects blue light are formed in a cross shape. The three colors of light which are modulated by the respective liquid crystal light bulbs 121, 122, and 123 are combined by the dielectric multilayer films to form the light representing the color image.

The projection lens 117 enlarges the light which is combined by the cross dichroic prism 116 and projects the enlarged image onto the screen 130. Accordingly, a full color image is enlarged and displayed on the screen 130. In the present embodiment, a value which falls within a range of 1.7 to 2.2 or a value which falls within a range of 1.8 to 2.2 is used as the F number of the projection lens 117.

Note that, the numerical aperture NA of the projection lens 117 can be obtained from the F number and the acceptance angle θ of the projection lens 117 using $NA=1/(2\times F)=\sin\theta$. According to the equation, the greater the F number of the projection lens 117 is, the smaller the acceptance angle θ becomes. Of the light incident on the projection lens 117, light with an inclination angle in relation to the optical axis of the projection lens 117 greater than the acceptance angle θ is subjected to vignetting by the projection lens 117, and becomes light which is not used, and does not contribute to the display of the image.

In the short-focus projector 100, there is demand for the efficiency for light utilization to be high such that a bright image can be obtained on the screen 130. In other words, there is demand for the efficiency for light utilization in the liquid crystal light bulbs 121, 122, and 123 to be high in relation to the light which is supplied from the polarizing illumination device 110, and, for the amount of light which is subjected to vignetting by the projection lens 117 to be little in relation to the light passing through the liquid crystal light bulbs 121, 122, and 123.

Electro-Optical Device

Figure 2A:
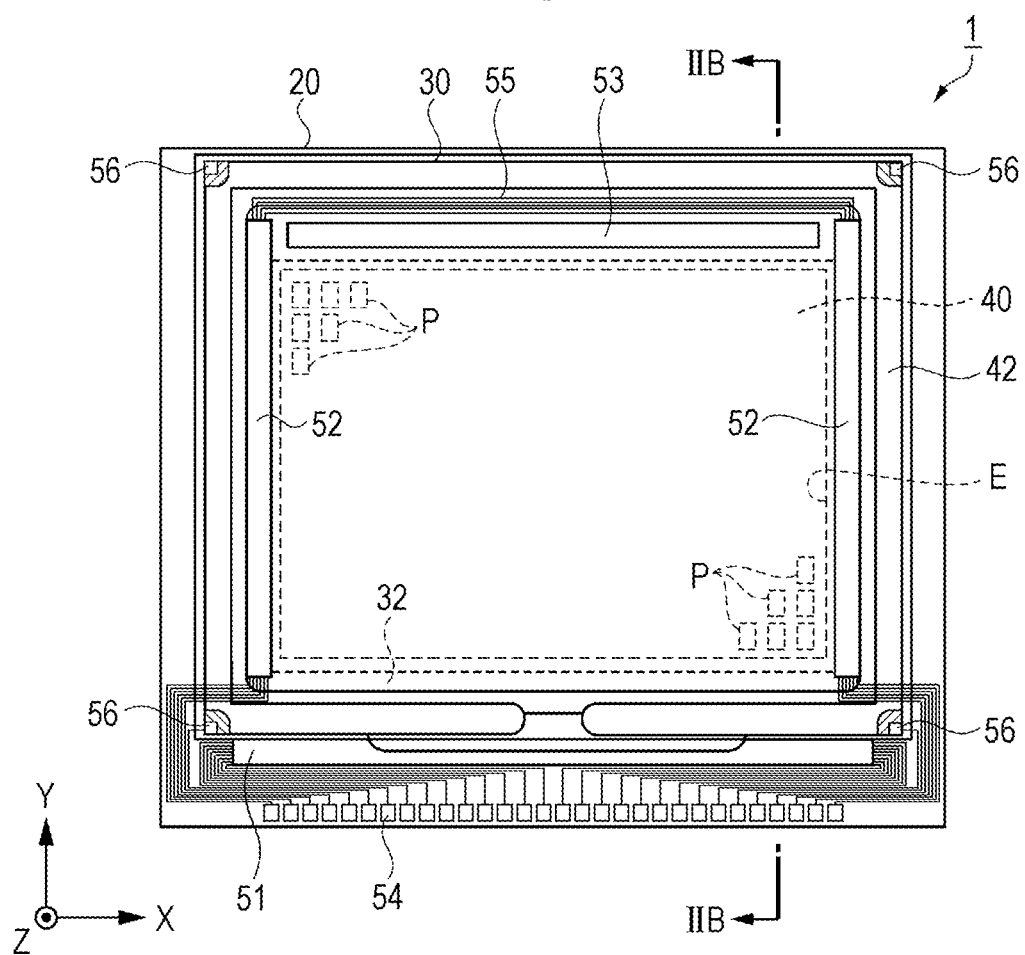
FIGS. 2A and 2B are schematic diagrams illustrating the configuration of a liquid crystal device according to the present embodiment.
Figure 2B:
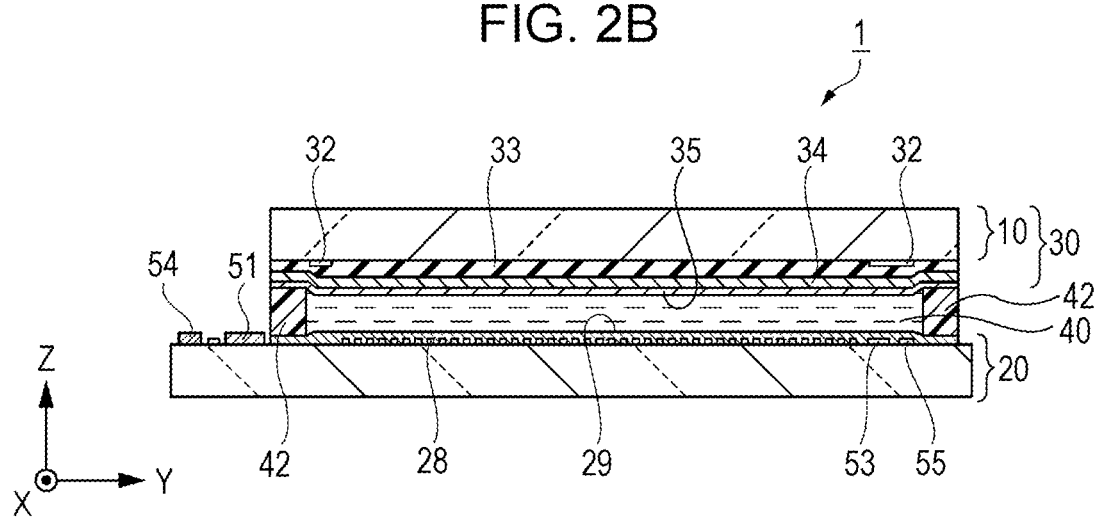
Figure 3:
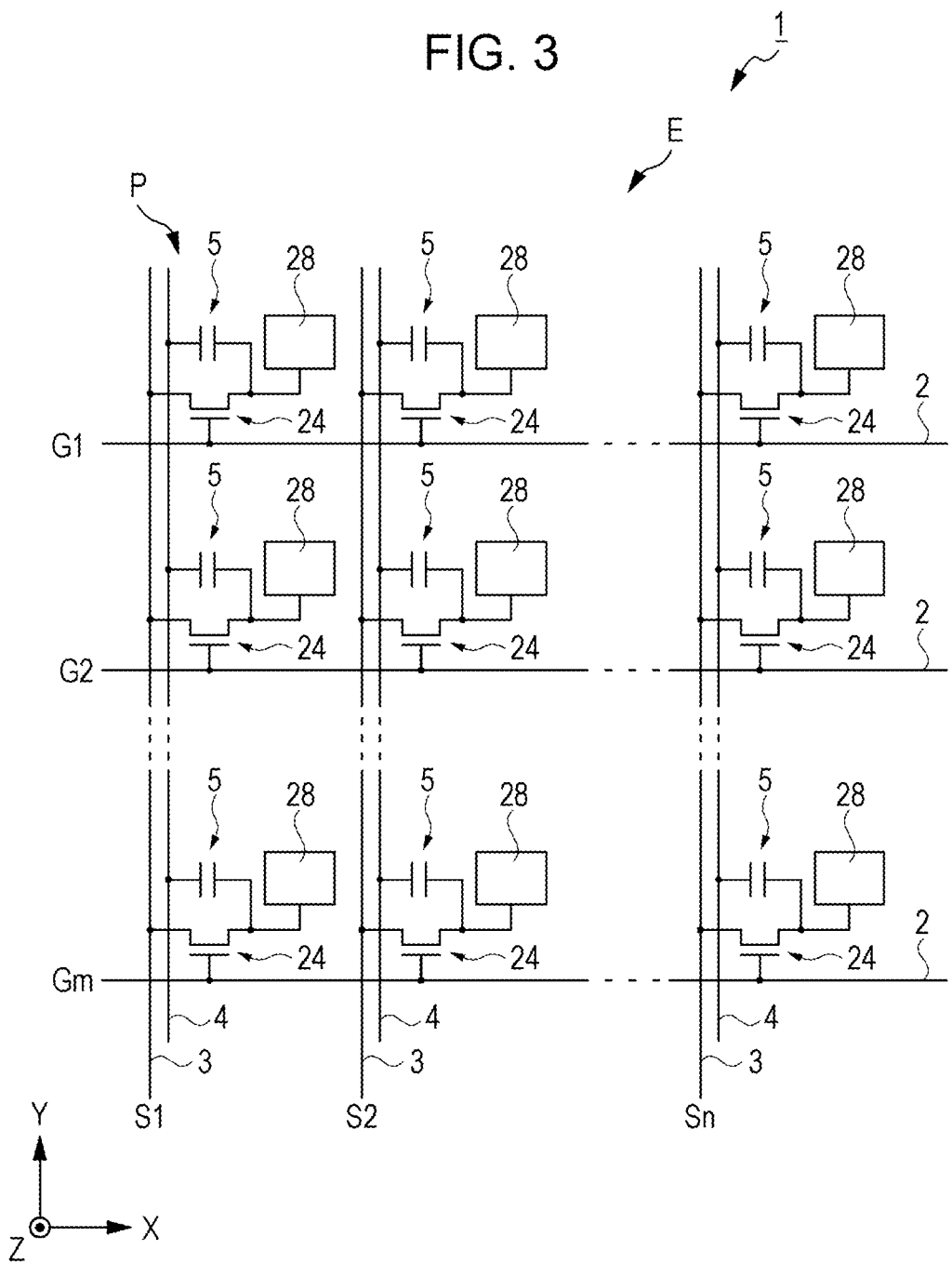
FIG. 3 is an equivalent circuit diagram illustrating the electrical configuration of the liquid crystal device according to the present embodiment.

Next, description will be given of the liquid crystal device as the electro-optical device according to the present embodiment, with reference to FIGS. 2A to 3. FIGS. 2A and 2B are schematic diagrams illustrating the configuration of a liquid crystal device according to the present embodiment. Specifically, FIG. 2A is a schematic plan view illustrating the configuration of the liquid crystal device, and FIG. 2B is a schematic cross-sectional view taken along line IIB-IIB of FIG. 2A. FIG. 3 is an equivalent circuit diagram illustrating the electrical configuration of the liquid crystal device according to the present embodiment.

The liquid crystal device 1 according to the present embodiment operates in twisted nematic (TN) mode or vertical alignment (VA) mode, for example. The liquid crystal device 1 is a transmission liquid crystal device which modulates light which is incident from an opposing substrate 30 side and emits the light from an element substrate 20 side. Here, description is given exemplifying an active matrix liquid crystal device, which is provided with a Thin Film Transistor (TFT) as a pixel switching element, as the liquid crystal device 1.

As illustrated in FIGS. 2A and 2B, the liquid crystal device 1 according to the present embodiment is provided with the element substrate 20 as the first substrate, the opposing substrate 30 as the second substrate which is disposed to oppose the element substrate 20, and a liquid crystal layer 40 as the electro-optical material layer which is disposed between the element substrate 20 and the opposing substrate 30. The opposing substrate 30 is provided with a prism substrate 10.

The element substrate 20 is larger than the opposing substrate 30, and the substrates are bonded to one another via a seal member 42 which is disposed in a frame shape. The liquid crystal layer 40 is configured of liquid crystals which have positive or negative dielectric anisotropy as the electro-optical material and are sealed in a space surrounded by the element substrate 20, the opposing substrate 30, and the seal member 42.

The seal member 42 is formed of an adhesive such as a heat curing or an ultraviolet curing epoxy resin, for example. Spacers (not shown) for maintaining a fixed interval between the element substrate 20 and the opposing substrate 30 are mixed into the seal member 42. A frame shaped light shielding layer 32, which is provided on the opposing substrate 30, is disposed on the inside of the seal member 42 which is disposed in a frame shape. The light shielding layer 32 is formed of a metal or a metallic oxide with light shielding properties, for example.

The inside of the light shielding layer 32 is a display region E in which a plurality of pixels P is arranged. The display region E is a region that actually contributes to the display in the liquid crystal device 1. Note that, while omitted from FIGS. 2A and 2B, light shielding portions 6 (refer to FIG. 4) are provided in the display region E in a lattice pattern along the boundaries of the plurality of pixels P.

A data line drive circuit 51 and a plurality of external connection terminals 54 are provided on the outside of the seal member 42 of a side portion of the element substrate 20, along the side portion. A test circuit 53 is provided on the inside of the seal member 42 which runs along another side portion that opposes the side portion described above. Scan line drive circuits 52 are provided on the inside of the seal member 42 which runs along the other two side portions, which are perpendicular to the two sides described above and oppose one another.

A plurality of wirings 55 which connect the two scan line drive circuits 52 are provided inside the seal member 42 of the side on which the test circuit 53 is provided. The wiring which is connected to the data line drive circuit 51 and the scan line drive circuits 52 is connected to the plurality of external connection terminals 54. Vertical electrical connection portions 56 for electrically connecting the element substrate 20 to the opposing substrate 30 are provided on the corner portions of the opposing substrate 30. Note that, the disposition of the test circuit 53 is not limited to that described above, and the test circuit 53 may be provided in a position along the inside of the seal member 42 between the data line drive circuit 51 and the display region E.

In the description hereinafter, a direction along the side at which the data line drive circuit 51 is provided is set to an X direction, and a direction along the other two sides, which are perpendicular to the side described above and oppose one another, is set to a Y direction. The direction along the line IIB-IIB of FIG. 2A is a direction along the Y direction. A direction which is perpendicular to the X direction and the Y direction and which proceeds upward in FIG. 2B is set to a Z direction. Note that, in the present specification, viewing the surface of the opposing substrate 30 of the liquid crystal device 1 from a normal line direction (the Z direction) is referred to as "plan view".

As illustrated in FIG. 2B, TFTs 24 (refer to FIG. 3) provided for each pixel P, optically transparent pixel electrodes 28, wiring (not shown), and an alignment layer 29 which covers the pixel electrodes 28 are provided on the liquid crystal layer 40 side of the element substrate 20. The pixel electrodes 28 are formed of an optically transparent conductive film of Indium Tin Oxide (ITO), Indium Zinc Oxide (IZO) or the like.

The opposing substrate 30 is provided with the prism substrate 10, on which prisms 15 (refer to FIG. 5) are provided as the reflecting portions described later. The light shielding layer 32, an inter-layer layer 33, a common electrode 34, and an alignment layer 35 which covers the common electrode 34 are provided on the liquid crystal layer 40 side of the opposing substrate 30.

As illustrated in FIGS. 2A and 2B, the light shielding layer 32 is provided in a frame shape in a position that overlaps the scan line drive circuits 52, the plurality of wirings 55, and the test circuit 53 in plan view. The light shielding layer 32 serves to prevent erroneous operation caused by the light of peripheral circuits including the drive circuits by blocking the light which is incident from the opposing substrate 30 side. The light shielding layer 32 also secures high contrast in the display of the display region E by shielding such that unnecessary stray light is not incident on the display region E.

The inter-layer layer 33 illustrated in FIG. 2B is formed to cover the light shielding layer 32. The inter-layer layer 33 is formed of an insulating film such as a silicon oxide film ($SiO_2$), for example, and has optical transparency. The inter-layer layer 33 is provided to alleviate unevenness arising from the light shielding layer 32 and the like, and such that the surface of the liquid crystal layer 40 side on which the common electrode 34 is formed is smoothened. A film formation method using plasma Chemical Vapor Deposition (CVD) or the like can be exemplified as the formation method of the inter-layer layer 33.

The common electrode 34 is formed of an optically transparent conductive film of Indium Tin Oxide (ITO), Indium Zinc Oxide (IZO) or the like; and, in addition to covering the inter-layer layer 33, the common electrode 34 is electrically connected to the wiring of the element substrate 20 by the vertical electrical connection portions 56 which are provided on the four corners of the opposing substrate 30 as illustrated in FIG. 2A. Note that, a configuration in which the inter-layer layer 33 is omitted may be adopted by forming the common electrode 34 to directly cover the electrically conductive light shielding layer 32.

The alignment layer 29 and the alignment layer 35 are selected on the basis of the optical design of the liquid crystal device 1. Examples of the alignment layer 29 and the alignment layer 35 include an alignment layer in which the liquid crystal molecules are subjected to a substantially horizontal alignment process by forming a film of an organic material such as a polyimide and rubbing the surface thereof, and an alignment layer in which the liquid crystal molecules are subjected to a substantially vertical alignment process by forming a film using the vapor phase epitaxial method with an inorganic material such as SiOx (silicon oxide).

The liquid crystal which configures the liquid crystal layer 40 enables gradation display by modulating light due to the alignment or the order of the molecular assembly changing according to the applied voltage level. For example, when a normally white mode is adopted, the transmittance in relation to incident light is reduced in units of each of the pixels P according to the applied voltage. When a normally black mode is adopted, the transmittance in relation to incident light is increased in units of each of the pixels P according to the applied voltage, and overall, light with a contrast corresponding to the image signal is emitted from the liquid crystal device 1.

As shown in FIG. 3, in the display region E, scan lines 2 and data lines 3 are formed to intersect one another, insulated from one another. The scan lines 2 extend in the X direction, and the data lines 3 extend in the Y direction. The pixels P are provided corresponding to the intersections of the scan lines 2 and the data lines 3. Each of the pixels P is provided with a pixel electrode 28 and a TFT 24 (Thin Film Transistor) as the switching element.

The source electrode (not shown) of the TFT 24 is electrically connected to the data line 3 which extends from the data line drive circuit 51. Image signals (data signals) S1, S2, ..., Sn are supplied to the data lines 3 in line order from the data line drive circuit 51 (refer to FIG. 2A). The gate electrode (not shown) of the TFT 24 is a portion of the scan line 2 that extends from the scan line drive circuit 52. Scan signals G1, G2, ..., Gm are supplied to the scan lines 2 in line order from the scan line drive circuit 52. The drain electrode (not shown) of the TFT 24 is electrically connected to the pixel electrode 28.

The image signals S1, S2, ..., Sn are written to the pixel electrodes 28 at predetermined timings via the data lines 3 by setting the TFTs 24 to the ON state for a fixed period only. The image signal of a predetermined level which is written to the liquid crystal layer 40 via the pixel electrode 28 in this manner is held for a fixed period in a liquid crystal capacitor which is formed between the pixel electrode 28 and the common electrode 34 which is provided on the opposing substrate 30 (refer to FIG. 2B).

Note that, in order to prevent the held image signals S1, S2, ..., Sn from leaking, a storage capacitor 5 is formed between a capacitor line 4 that is formed along the data line 3 parallel thereto and the pixel electrode 28, and is disposed parallel to the liquid crystal capacitor. In this manner, when a voltage signal is applied to the liquid crystal of each of the pixels P, the alignment state of the liquid crystal changes according to the applied voltage level. Accordingly, the light that is incident on the liquid crystal layer 40 (refer to FIG. 5) is modulated and gradation display is possible.

Figure 4:
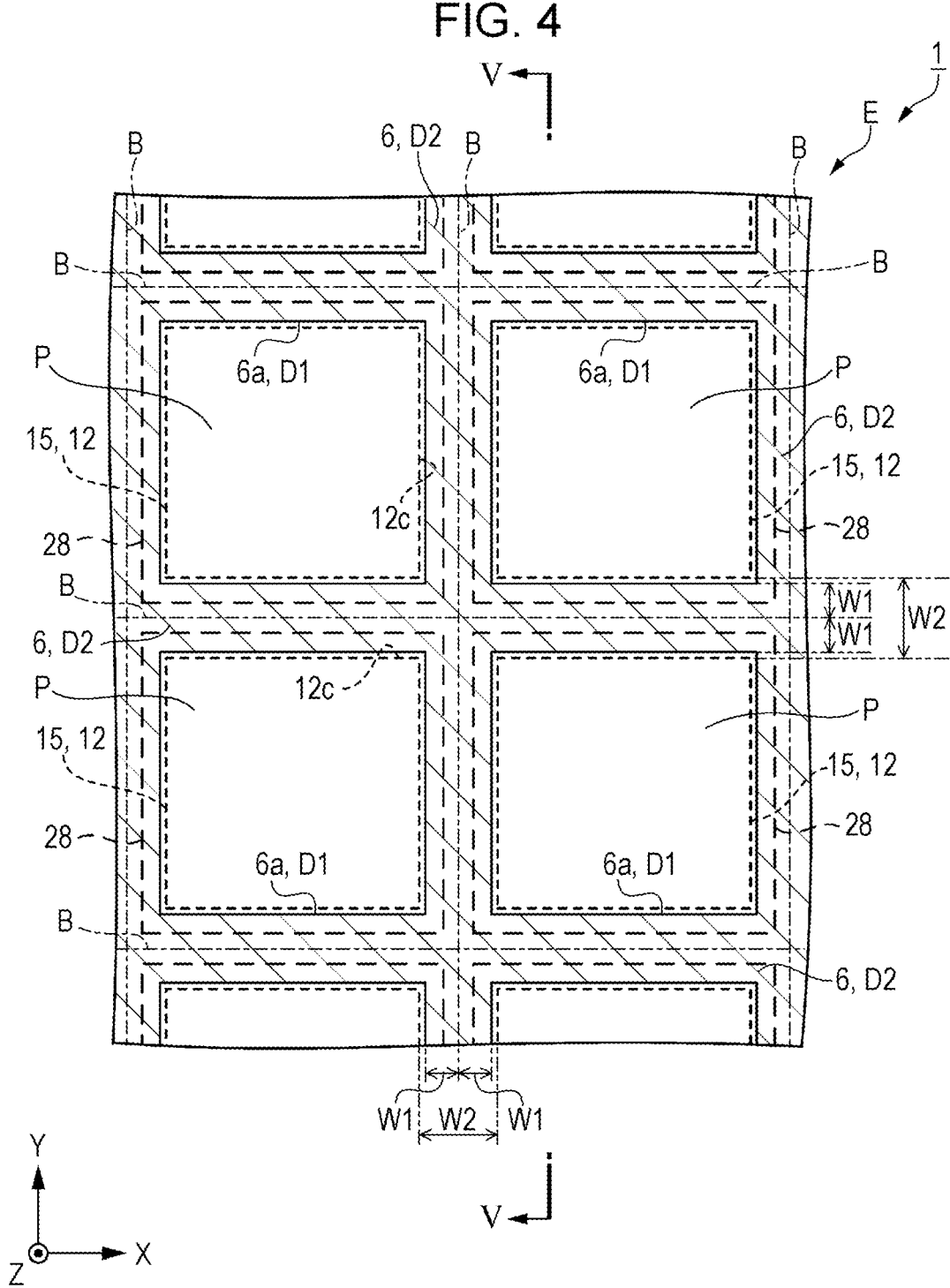
FIG. 4 is a schematic plan view illustrating the arrangement of pixels and light shielding portions.
Figure 5:
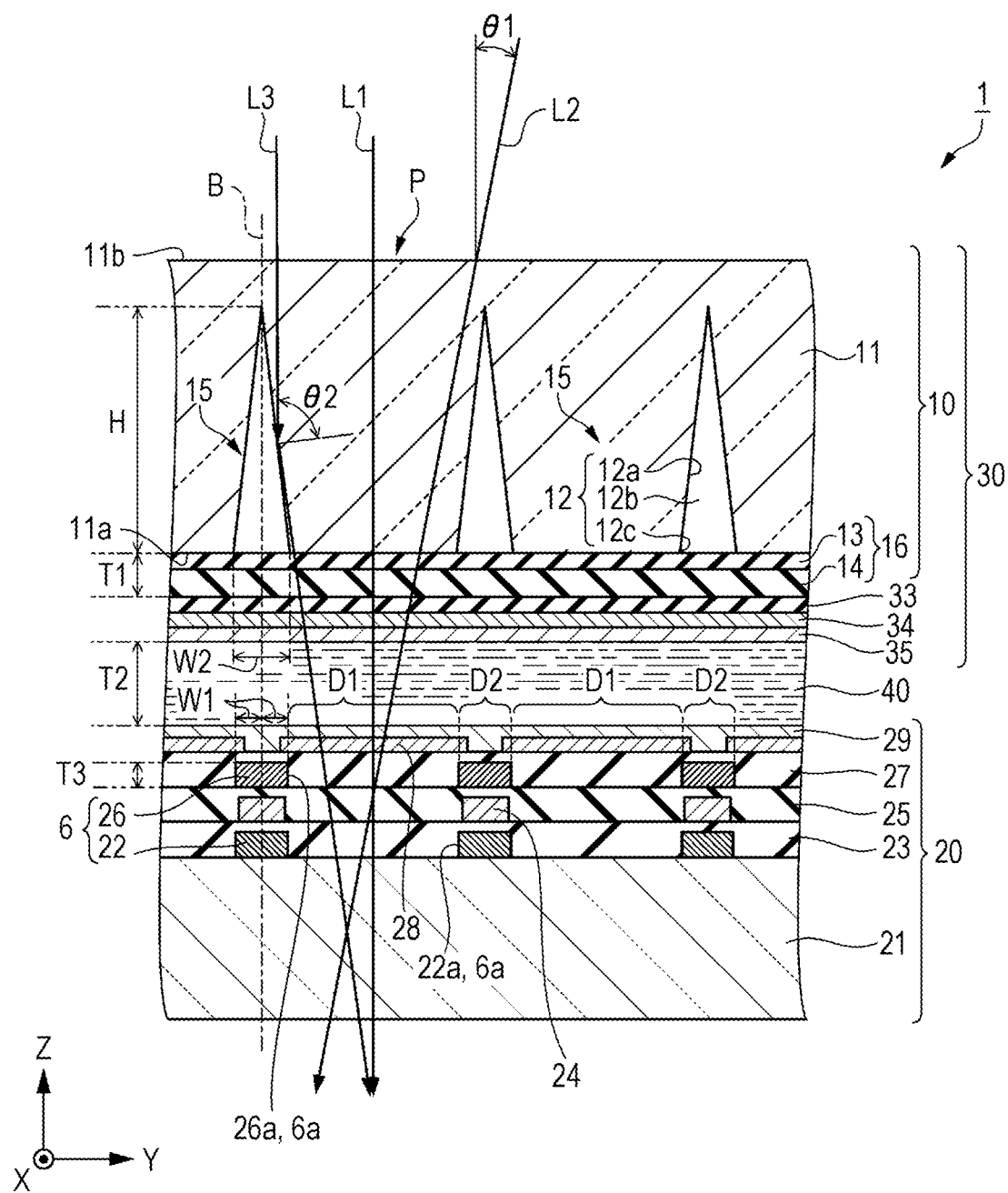
FIG. 5 is a schematic cross-sectional view taken along line V-V of FIG. 4.

Next, the detailed configuration of the liquid crystal device 1 will be described with reference to FIGS. 4 and 5. FIG. 4 is a schematic plan view illustrating the arrangement of pixels and light shielding portions. FIG. 5 is a schematic cross-sectional view taken along line V-V of FIG. 4. As illustrated in FIG. 4, the plurality of pixels P are partitioned by virtual boundaries B indicated with two-dot chain lines in the X direction and the Y direction, and have a rectangular shape in plan view. In the present embodiment, the pixels P have a substantially square shape. The pixels P are arranged in a matrix pattern along the X direction and the Y direction in the display region E.

As indicated using diagonal shading in FIG. 4, the light shielding portions 6 are disposed in a lattice pattern which extends in the X direction and the Y direction. The light shielding portions 6 are formed of a light shielding layer 26 and a light shielding layer 22 (refer to FIG. 5), which serve as the light shielding layers provided in the element substrate 20. In relation to each of the pixels P, the light shielding portions 6 are disposed in the peripheral edge portion along the four edges of a substantially square shape, and are provided with approximately the same widths W1 in the X direction and the Y direction. The width W1 of the light shielding portion 6 is approximately 0.525 µm to 0.625 µm, for example.

In the display region E, a region in which light is blocked by the light shielding portions 6 is referred to as a light shielding region D2. The width of the light shielding regions D2 spanning between the adjacent pixels P in the X direction and the Y direction, interposing the boundary B, is double the width W1 of the light shielding portion 6. The TFTs 24 (refer to FIG. 5) provided in the element substrate 20 are provided for each pixel P in the light shielding region D2. Incidence of light on the TFT 24 is suppressed by disposing the TFT 24 in the light shielding region D2.

In the light shielding region D2, the scan line 2 (refer to FIG. 3) which extends in the X direction, and the data line 3 (refer to FIG. 3) which extends in the Y direction are provided, and in addition thereto, a capacitor electrode which is formed of a light shielding electrically conductive material, and a wiring or an electrode such as a relay electrode is provided. At least one of the light shielding layer 22 and the light shielding layer 26 may be configured in a lattice pattern such that the wirings and electrodes thereof complement one another.

The prisms 15 (grooves 12) which are provided in the opposing substrate 30 are disposed in the light shielding region D2. The prisms 15 (the grooves 12) are disposed in a lattice pattern which extends in the X direction and the Y direction so as to overlap the light shielding portions 6 in plan view, and are provided to span the pixels P which are adjacent in the X direction and the Y direction. The prism 15 (the groove 12) is provided with the same width W2 in the X direction and the Y direction. The width W2 of the prism 15 (the groove 12) is approximately 0.7 µm to 3.0 µm, for example. It is preferable that the width W2 of the prism 15 (the groove 12) be set to the same as double the width W1 of the light shielding portion 6, or to slightly wider.

The light shielding portions 6 have substantially rectangular opening portions 6a corresponding to each of the pixels P. Inside the opening portion 6a is a region through which light passes, and the region is referred to as an opening region D1 of the pixel P. The pixel electrodes 28 provided in the element substrate 20 are rectangular (substantially square) in plan view, and are disposed to correspond to each of the pixels P. Therefore, the opening portions 6a of the light shielding portions 6 are provided to correspond to each of the plurality of pixel electrodes 28. The pixel electrode 28 is formed to be larger than the opening portion 6a, and is disposed such that the peripheral edge portion thereof overlaps the light shielding region D2 (the light shielding portion 6) in plan view.

As illustrated in FIG. 5, the element substrate 20 is provided with a substrate 21, the light shielding layer 22 and the light shielding layer 26 (the light shielding portion 6), an insulating layer 23, the TFTs 24, an insulating layer 25, an insulating layer 27, the pixel electrodes 28, and the alignment layer 29. The substrate 21 is formed of a material that has optical transparency such as glass or quartz, for example.

The light shielding layer 22 is provided on the substrate 21. The light shielding layer 22 has opening portions 22a (the opening portions 6a) corresponding to each of the pixels P. The light shielding layer 22 is formed of a single metal, an alloy, a metal silicide, a polysilicide, a nitride, or a laminate of these including at least one of a metal material such as Al (aluminum), Mo (molybdenum), W (tungsten), Ti (titanium), Ta (tantalum), and Cr (chrome), and the light shielding layer 22 has light shielding properties.

The insulating layer 23 is provided to cover the substrate 21 and the scan lines 2. The insulating layer 23 is formed of an insulating film such as a silicon oxide film ($SiO_2$), for example, and has optical transparency. The TFT 24 is provided on the insulating layer 23. The TFT 24 is a switching element that drives the pixel electrode 28. The TFT 24 is configured of a semiconductor layer, a gate electrode, a source electrode, and a drain electrode (none of which are shown).

The semiconductor layer is configured from a polycrystalline silicon film and is formed in an island pattern, for example. A source region, a channel region, and a drain region are formed in the semiconductor layer by implanting impurity ions. A Lightly Doped Drain (LDD) region may be formed between the channel region and the source region, or, between the channel region and the drain region.

The gate electrode is formed in a region of the element substrate 20 which overlaps the channel region of the semiconductor layer in plan view via a portion (the gate insulation film) of the insulating layer 25. While not depicted in the drawings, the gate electrode is electrically connected to the scan line 2 that is disposed on the lower layer side via a contact hole, and the TFT 24 is controlled to turn ON or OFF by the application of a scan signal.

Note that the structure of the TFT 24 is not limited to the so-called top gate structure, and a so-called bottom gate structure in which a portion of the scan line 2 which overlaps the channel region of the semiconductor layer via the insulating layer 23 functions as the gate electrode may be adopted.

The insulating layer 25 is provided to cover the insulating layer 23 and the TFTs 24. The insulating layer 25 is formed of an insulating film such as a silicon oxide film ($SiO_2$), for example, and has optical transparency. The insulating layer 25 includes a gate insulation film that isolates the semiconductor layer of the TFTs 24 from the gate electrodes. Unevenness that occurs in the surface due to the TFTs 24 is alleviated by the insulating layer 25.

The light shielding layer 26 is provided on the insulating layer 25. The light shielding layer 26 has opening portions 26a (the opening portions 6a) corresponding to each of the pixels P. The light shielding layer 26 is formed of the same material as the light shielding layer 22, and has light shielding properties. The TFTs 24 are disposed to be interposed between the light shielding layer 22 and the light shielding layer 26 in the Z direction. Accordingly, the switching operation being rendered unstable due to light being incident on the semiconductor layer of the TFTs 24 is suppressed.

The width of the light shielding layer 26 is W1, and a layer thickness T3 of the light shielding layer 26 is approximately 2 µm to 5 µm, for example. The thinner the layer thickness T3 of the light shielding layer 26 is, the higher the efficiency for light utilization is for the liquid crystal device 1; however, when the layer thickness T3 of the light shielding layer 26 is excessively thin, the film thickness becomes non-uniform and there is a concern that sufficient light shielding properties cannot be secured.

The insulating layer 27 is provided to cover the insulating layer 25 and the light shielding layer 26. The insulating layer 27 is formed of an insulating film such as a silicon oxide film ($SiO_2$), for example, and has optical transparency.

The pixel electrodes 28 are provided on the insulating layer 27 to correspond to the pixels P. The pixel electrode 28 is disposed to overlap the opening region D1 of the pixel P in a planar manner. The pixel electrode 28 is electrically connected to the drain region in the semiconductor layer of the TFT 24 via a contact hole (not shown) provided in the insulating layer 25 and the insulating layer 27. The alignment layer 29 is provided to cover the pixel electrodes 28.

As described above, the opposing substrate 30 is provided with the prism substrate 10, the light shielding layer 32 (refer to FIG. 2B), the inter-layer layer 33, the common electrode 34, and the alignment layer 35. Note that, the light shielding layer 32 is not only provided in a frame shape on the outside of the display region E, but may be formed in a lattice pattern or an island pattern to overlap the light shielding region D2 in the display region E.

The liquid crystal layer 40 is held between the alignment layer 29 of the element substrate 20 side and the alignment layer 35 of the opposing substrate 30 side. The layer thickness T2 of the liquid crystal layer 40 is approximately 2 μm to 4 μm, for example. Note that, the thinner the layer thickness T2 of the liquid crystal layer 40 is, the smaller the distance between the prisms 15 and the light shielding layer 26 becomes, which is beneficial for an improvement in the efficiency for light utilization; however, there is a range of the layer thickness T2 which is favorable for light modulation, depending on the type of the liquid crystal in the liquid crystal layer 40.

Prism

Next, description will be given of the configuration of the prism substrate 10 and the prisms 15 as the reflecting portions provided on the prism substrate 10. As illustrated in FIG. 5, the prism substrate 10 includes a substrate 11, the prisms 15 which are provided on a surface 11a side of the substrate 11, and a sealing layer 16 which is provided on the surface 11a. The substrate 11 is formed of a material that has optical transparency such as quartz, glass, sapphire glass, or Neoceram, for example. The material of the substrate 11 is quartz in the present embodiment.

The prisms 15 include the grooves 12 which are formed in the surface 11a side of the substrate 11. The grooves 12 are formed in an approximate V-shape in cross-sectional view so as to be open toward the light shielding layer 26. The cross-section of the groove 12 is an approximate isosceles triangle shape, the bottom side of which being an opening portion 12c which is open to the surface 11a, and the two sides of which being two inclined surfaces 12a of an approximate V-shape. The inner portion of the groove 12 is a vacant portion 12b, which is in a vacant state.

The peak of the approximate isosceles triangle shape of the groove 12 is disposed in a position of the boundary B, which is the center in the width direction of the light shielding region D2. The length of the bottom side of the approximate isosceles triangle shape of the groove 12, that is, the width W2 of the opening portion 12c of the groove 12, is approximately 0.7 μm to 3.0 μm, as described above. The height in the Z direction of the peak of the approximate isosceles triangle shape of the groove 12, that is, a depth H of the groove 12, is approximately 25 μm to 35 μm.

The sealing layer 16 is provided on the surface 11a of the substrate 11. The sealing layer 16 is configured of a first sealing layer 13 and a second sealing layer 14, which are laminated in order on the surface 11a. The first sealing layer 13 covers the surface 11a of the substrate 11, and is formed in an overhanging state so as to block the opening portions 12c of the grooves 12. The first sealing layer 13 may be formed to enter the inner portion of the groove 12 slightly from the opening portion 12c.

The second sealing layer 14 is formed to cover the first sealing layer 13. The first sealing layer 13 and the second sealing layer 14 are formed of an insulating film such as a silicon oxide film, and have optical transparency. The layer thickness T1 of the sealing layer 16 (the first sealing layer 13 and the second sealing layer 14) is approximately 2 μm to 5 μm, for example. The thinner the layer thickness T1 of the sealing layer 16 is, the smaller the distance between the prisms 15 and the light shielding layer 26 becomes, which is beneficial for an improvement in the efficiency for light utilization; however, when the layer thickness T1 is excessively thin, cracks form easily in the sealing layer 16.

The grooves 12 are sealed by the sealing layer 16 (the first sealing layer 13 and the second sealing layer 14), and this forms the vacant portions 12b in a vacant state in the inner portions of the grooves 12. The vacant portions 12b are, for example, an air layer. The prism 15 has a function of causing the light which is incident from the surface 11b, which is the opposite side of the substrate 11 from the surface 11a, to reflect totally at the boundary surface (the inclined surfaces 12a) between the substrate 11 and the vacant portion 12b of the groove 12.

Since the incident light is caused to reflect totally, it is necessary that the optical conditions of the prism 15 satisfy R1>R2 and $\sin\theta 2 > R2/R1$, where R1 is the refractive index of the substrate 11, R2 is the refractive index of the vacant portion 12b, and θ2 is the angle of incidence of the incident light in relation to the normal line of the inclined surface 12a.

In the present embodiment, since quartz is used as the material of the substrate 11, the refractive index R1 of the substrate 11 is approximately 1.46. Since the vacant portion 12b is an air layer, the refractive index R2 of the vacant portion 12b is approximately 1.00, which is sufficiently low in relation to the refractive index R1 of the substrate 11. Therefore, it is possible to cause the incident light to reflect totally on the inclined surfaces 12a across a wide range of angles of the angle of incidence θ2 on the prism 15. Note that, the vacant portion 12b may be in a decreased pressure state or a state close to a vacuum.

In the liquid crystal device 1 which is used for the liquid crystal light bulbs 121, 122, and 123 (refer to FIG. 1) of the projector 100, the light which is emitted from the polarizing illumination device 110 (refer to FIG. 1) and incident from the opposing substrate 30 (the prism substrate 10) side is optically modulated by the liquid crystal layer 40 for each of the pixels P, is subsequently emitted to the element substrate 20 side, and is incident on the projection lens 117 (refer to FIG. 1).

As illustrated in FIG. 5, in the liquid crystal device 1, light is incident on various positions of the pixels P. For example, incident light L1 that enters along the optical axis and passes through the planar center of the opening region D1 of the pixel P proceeds directly through the inside of the opening region D1 of the pixel P as it is, passes through the liquid crystal layer 40 and is emitted therefrom, to the element substrate 20. Incident light L2 that enters the inside of the opening region D1 from a side closer to the outside than the incident light L1 at an angle of incidence θ1 in relation to the normal line of the surface 11b of the substrate 11 also proceeds directly through the inside of the opening region D1 of the pixel P as it is, passes through the liquid crystal layer 40 and is emitted therefrom, to the element substrate 20.

Meanwhile, when the prism 15 is not present, incident light L3 that is incident on the light shielding region D2 from a side closer to the outside than the incident light L1 is blocked by the light shielding layer 26 when the incident light L3 proceeds as it is. In the liquid crystal device 1, by causing the incident light L3 to be reflected by the prism 15, the incident light L3 is directed toward the opening region D1 of the pixel P. In this manner, in the liquid crystal device 1, since the incident light is efficiently guided toward the opening region D1 of the pixel P by the prism 15, it is possible to increase the efficiency for incident light utilization.

In the prism 15, the angle of the inclined surface 12a in relation to the normal line direction of the surface 11b of the substrate 11 is determined by the width W2 and the depth H of the opening portion 12c of the groove 12. When the depth H of the groove 12 is fixed, the smaller the width W2 of the opening portion 12c is, the smaller the angle of the inclined surface 12a becomes in relation to the normal line direction of the surface 11b; thus, after reflection on the inclined surface 12a, the angle of the incident light L3 also decreases in relation to the normal line direction of the surface 11b. Therefore, since the inclination angle of the incident light L3 decreases in relation to the optical axis of the projection lens 117, and the amount of light of inclination angles which exceed the acceptance angle θ decreases, the efficiency for light utilization is improved. Since it is possible to suppress the dispersion of the angles of the light that passes through the liquid crystal layer 40 in relation to the alignment direction of the liquid crystal molecules, the contrast is improved.

However, when the width W2 of the opening portion 12c is decreased in relation to the width W1 of the light shielding layer 26, the amount of light which is not reflected by the prism 15 (the inclined surface 12a) and is blocked by the light shielding layer 26 increases, thus causing a decrease in the efficiency for light utilization.

When the depth H of the groove 12 is fixed, the greater the width W2 of the opening portion 12c is, the greater the angle of the inclined surface 12a becomes in relation to the normal line direction. Therefore, the inclination angle of the incident light L3 in relation to the optical axis of the projection lens 117 is increased, and the dispersion of the angles of the light increases in relation to the alignment direction of the liquid crystal molecules of the liquid crystal layer 40, thus causing a decrease in the efficiency for light utilization, a decrease in the contrast or the like.

When the width W2 of the groove 12 is fixed, the shallower the depth H of the groove 12 is, the greater the angle of the inclined surface 12a becomes in relation to the normal line direction of the surface 11b, and the smaller the length (the area) of the inclined surface 12a becomes; thus, the function of the prism 15 as the reflecting portion is degraded.

Meanwhile, when the depth H of the groove 12 is excessively deep, the light which is reflected by the prism 15 (the inclined surface 12a) of one side of the pixel P is reflected again by the prism 15 (the inclined surface 12a) of the other side, which opposes the side described above in the X direction or the Y direction, and the angle of the light after being reflected again by the inclined surface 12a increases. Therefore, the dispersion of the angles of the light increases in relation to the alignment direction of the liquid crystal molecules of the liquid crystal layer 40, and the amount of light of inclination angles which exceed the acceptance angle θ of the projection lens 117 increases, thus causing a decrease in the contrast, a decrease in the efficiency for light utilization, and the like.

Note that the setting of the width W2 and the depth H of the groove 12 in the prism 15 is determined based on the angular distribution of the incident light, the F number of the projection lens 117 of the projector 100 described above, and the like. The efficiency for light utilization is not only influenced by the width W2 and the depth H of the groove 12 in the prism 15, but is also influenced by the layer thickness T1 of the sealing layer 16 (the first sealing layer 13 and the second sealing layer 14), the layer thickness T2 of the liquid crystal layer 40, the layer thickness T3 of the light shielding layer 26, the width W1 of the light shielding layer 26, and the like. Therefore, there is demand to adopt settings which result in the highest efficiency for light utilization in the configuration of the projector 100 when designing the prisms 15 and the other components which influence the efficiency for light utilization.

Incidentally, as described above, the projector 100 is a short-focus projector which projects onto the screen 130 from a position closer than normal. In the projector 100, a lens with a small F number, as in the case in which an F number is 1.4, for example, is not suitable as the projection lens 117. Therefore, a projection lens 117 with an F number of 1.5 or greater is used in the projector 100.

However, generally, even when one of prisms and micro lenses is provided, the efficiency for light utilization decreases when the F number of the projection lens 117 is great. Therefore, in the projector 100, which is a short-focus projector that uses the liquid crystal devices 1 provided with the prisms 15 as the liquid crystal light bulbs 121, 122, and 123, there is demand to discover conditions in which it is possible to realize higher efficiency for light utilization than when the liquid crystal device 1 is provided with micro lenses.

Efficiency for Light Utilization

Next, description will be given of the efficiency for light utilization in the liquid crystal device 1 of the present embodiment based on example 1 and example 2. FIGS. 6A to 6D are graphs illustrating the efficiency for light utilization in example 1. FIGS. 7A to 7D are graphs illustrating the efficiency for light utilization in example 2.

Example 1

In example 1, the width W1 of the light shielding layer 26 in FIG. 5 is 0.575 μm, the width W2 of the groove 12 is 1.5 μm, the depth H of the groove 12 is 30 μm, the layer thickness T1 of the sealing layer 16 is 3.5 μm, the layer thickness T2 of the liquid crystal layer 40 is 2.5 μm, and the layer thickness T3 of the light shielding layer 26 is 3.7 μm. Note that, the layer thicknesses of each of the inter-layer layer 33, the common electrode 34, and the alignment layer 35 of the opposing substrate 30; and those of the light shielding layer 26, the insulating layer 27, the pixel electrode 28, and the alignment layer 29 of the element substrate 20 may be ignored with regard to the efficiency for light utilization.

Figure 6A:
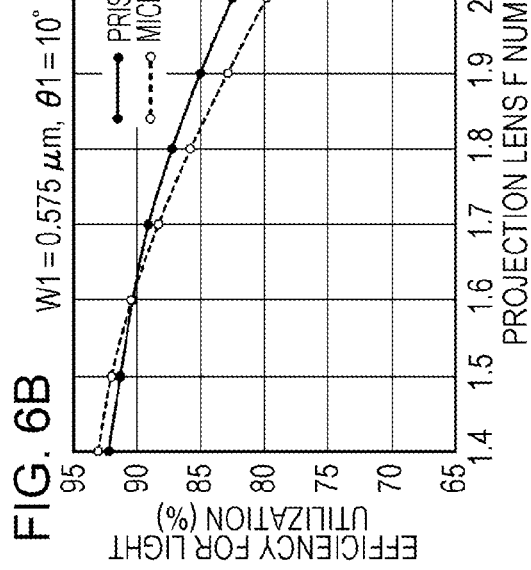
FIGS. 6A to 6D are graphs illustrating the efficiency for light utilization in example 1.
Figure 6B:
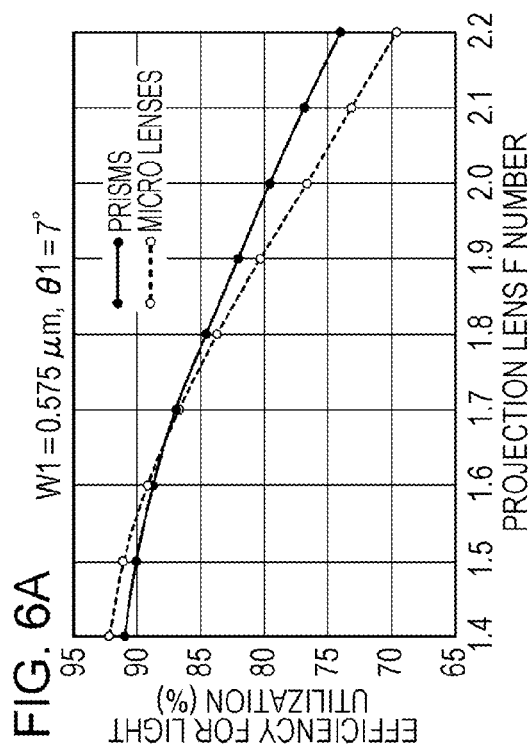
Figure 6C:
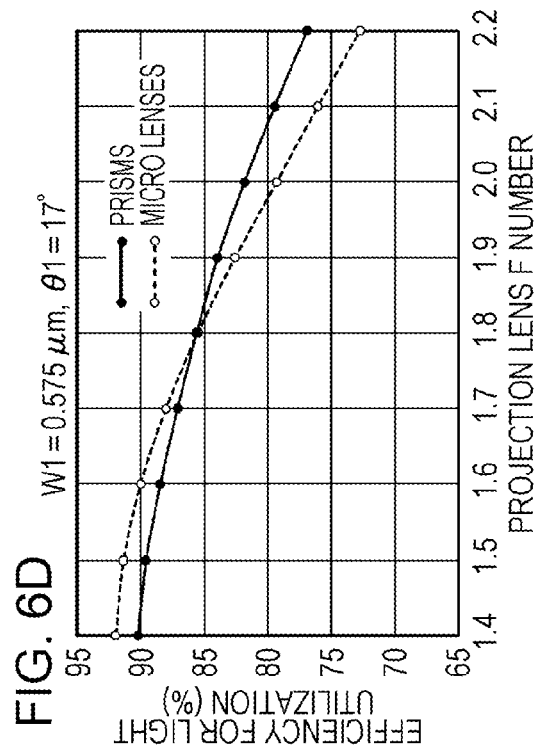
Figure 6D:
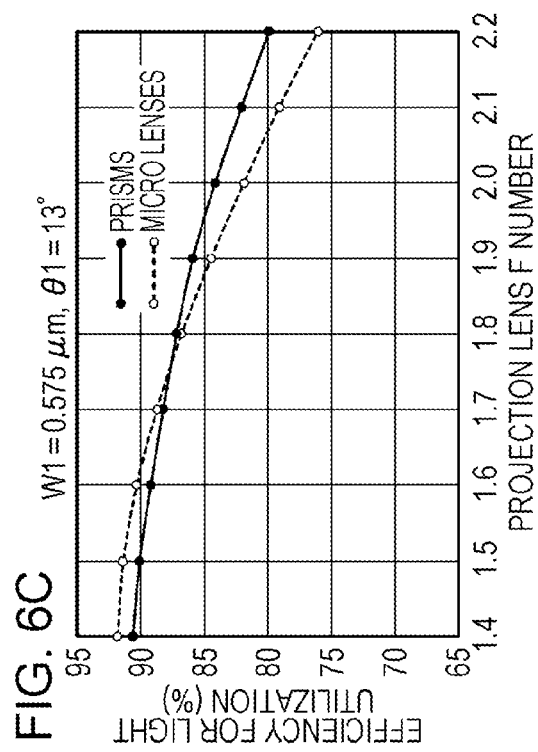

The graphs in FIGS. 6A to 6D, show the efficiency for light utilization for when the F number of the projection lens 117 is varied from 1.4 to 2.2 using a solid line, in cases in which the angle of incidence θ1 of the incident light which is incident on the surface 11b of the substrate 11 of the liquid crystal device 1 is 7°, 10°, 13°, and 17°, respectively. FIG. 6A is a graph of a case in which the angle of incidence θ1 of the incident light which is incident on the surface 11b of the substrate 11 is 7°, FIG. 6B is a graph of a case in which the angle of incidence θ1 is 10°, FIG. 6C is a graph of a case in which the angle of incidence θ1 is 13°, and FIG. 6D is a graph of a case in which the angle of incidence θ1 is 17°.

Each of the graphs in FIGS. 6A to 6D shows the efficiency for light utilization of a liquid crystal device 1A (refer to FIG. 8B) provided with micro lenses 17 in comparison to that of the liquid crystal device 1 using a broken line. The micro lenses 17 with which the liquid crystal device 1A is provided are micro lenses with a substantially semispherical shape. Note that, in the liquid crystal device 1A, the configuration is substantially the same as that of the liquid crystal device 1, except in that the micro lenses 17 are provided instead of the prisms 15, and an optical path length adjustment layer (not shown) for matching the distance from the micro lenses 17 to the light shielding layer 26 (refer to FIG. 8B) to a desired value is provided instead of the sealing layer 16.

In each of the graphs in FIGS. 6A to 6D, the horizontal axis is the F number of the projection lens 117 and the vertical axis is the efficiency for light utilization (%). Here, the term "efficiency for light utilization" refers to the proportion of the amount of light which is emitted from the projection lens 117 when the amount of light which is supplied from the polarizing illumination device 110 and is incident on the liquid crystal device 1 or 1A is considered to be 100%.

According to the above description, the greater the F number of the projection lens 117 is, the smaller the acceptance angle θ becomes; thus, the amount of light which is not used by the projection lens 117 increases. Therefore, in the graphs in FIGS. 6A to 6D, regardless of which angle of incidence θ1 is adopted, and, regardless of which of the liquid crystal device 1 provided with the prisms 15 and the liquid crystal device 1A provided with the micro lenses 17 is used, the further the F number of the projection lens 117 is increased above 1.4, the more the efficiency for light utilization decreases.

When the angle of incidence θ1 shown in FIG. 6A is 7°, and when the angle of incidence θ1 shown in FIG. 6B is 10°, the efficiency for light utilization is higher in the case of the liquid crystal device 1A provided with the micro lenses 17 where the F number of the projection lens 117 is from 1.4 to 1.6. When the F number of the projection lens 117 is 1.7 or greater, the efficiency for light utilization is higher in the case of the liquid crystal device 1 provided with the prisms 15.

When the angle of incidence θ1 shown in FIG. 6C is 13°, and when the angle of incidence θ1 shown in FIG. 6D is 17°, the efficiency for light utilization is higher in the case of the liquid crystal device 1A provided with the micro lenses 17 where the F number of the projection lens 117 is from 1.4 to 1.7. When the F number of the projection lens 117 is 1.8 or greater, the efficiency for light utilization is higher in the case of the liquid crystal device 1 provided with the prisms 15.

Example 2

Next, description will be given of the efficiency for light utilization in example 2. The settings in example 2 are the same as those in example 1, except in that the width W1 of the light shielding layer 26 is set to 0.625 μm. In the same manner as the graphs in FIGS. 6A to 6D, the graphs in FIGS. 7A to 7D show comparisons of the efficiency for light utilization for when the F number of the projection lens 117 is varied from 1.4 to 2.2, in cases in which the angle of incidence θ1 of the incident light is 7°, 10°, 13°, and 17°, respectively.

Figure 7A:
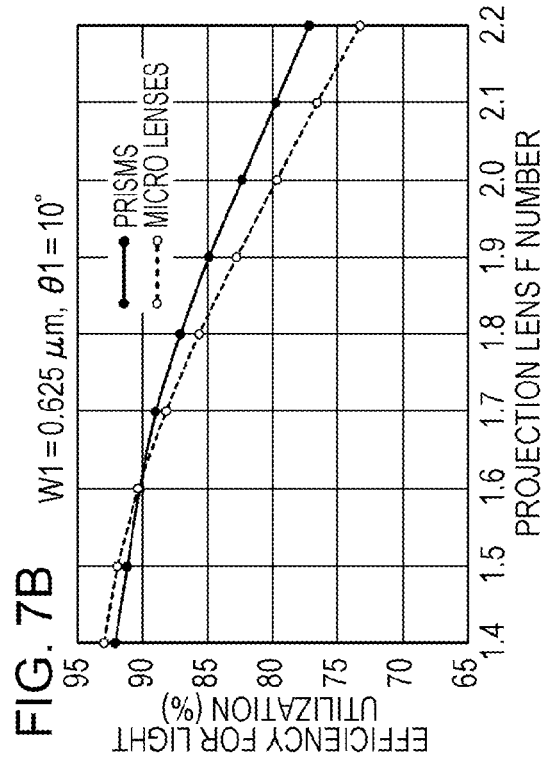
FIGS. 7A to 7D are graphs illustrating the efficiency for light utilization in example 2.
Figure 7B:
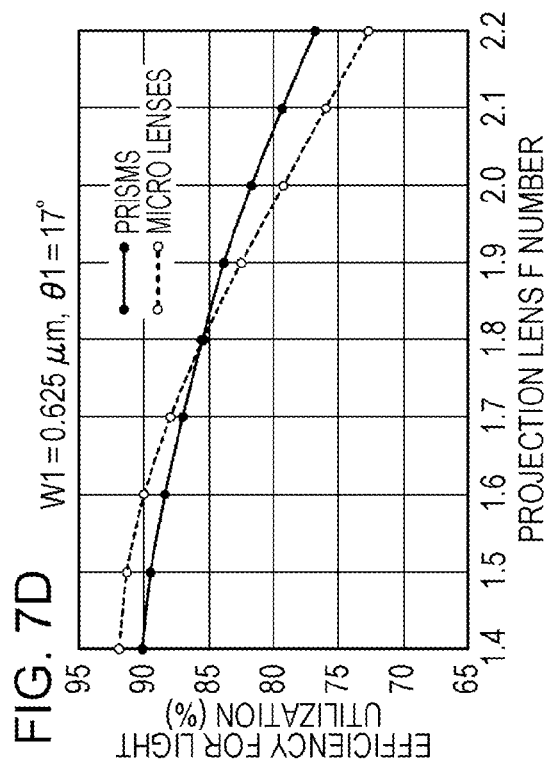

As can be understood from the graphs in FIGS. 7A to 7D, the same tendencies are seen in example 2 as in example 1. When the angle of incidence θ1 shown in FIG. 7A is 7°, and when the angle of incidence θ1 shown in 7B is 10°, the efficiency for light utilization is higher in the case of the liquid crystal device 1A provided with the micro lenses 17 where the F number of the projection lens 117 is from 1.4 to 1.6. When the F number of the projection lens 117 is 1.7 or greater, the efficiency for light utilization is higher in the case of the liquid crystal device 1 provided with the prisms 15.

Figure 7C:
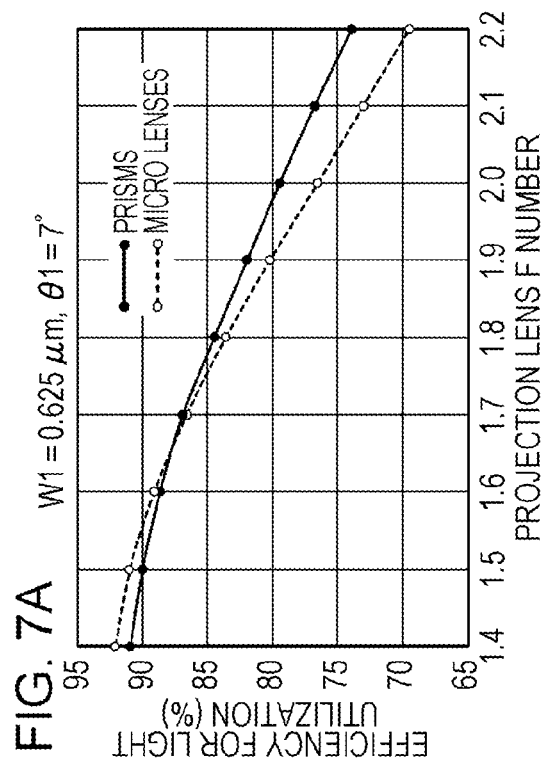
Figure 7D:
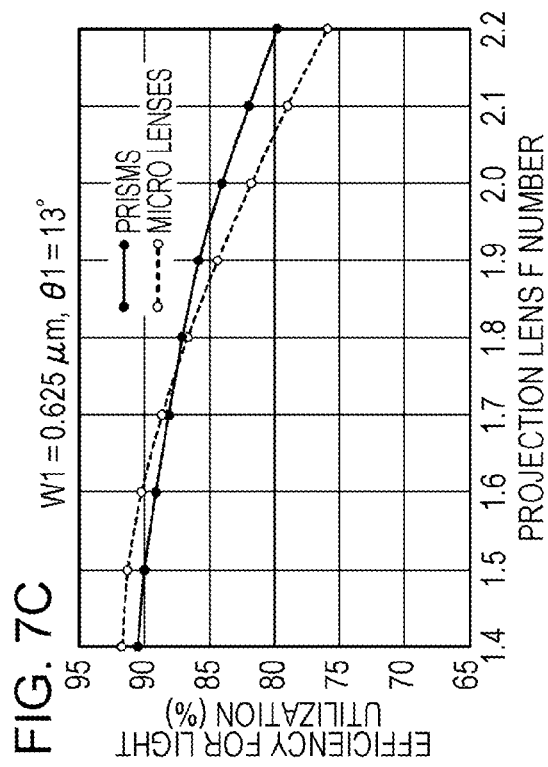

When the angle of incidence θ1 shown in FIG. 7C is 13°, and when the angle of incidence θ1 shown in 7D is 17°, the efficiency for light utilization is higher in the case of the liquid crystal device 1 provided with the micro lenses 17 where the F number of the projection lens 117 is from 1.4 to 1.7. When the F number of the projection lens 117 is 1.8 or greater, the efficiency for light utilization is higher in the case of the liquid crystal device 1 provided with the prisms 15.

From the results of example 1 and example 2 described above, at least when the width W1 of the light shielding layer 26 falls within a range of 0.575 μm to 0.625 μm, when the angle of incidence θ1 of the incident light falls within a range of 7° to 17°, when the F number of the projection lens 117 falls within a range of 1.8 to 2.2, the efficiency for light utilization is higher in the case of the liquid crystal device 1 provided with the prisms 15 of the present embodiment.

Further, at least when the width W1 of the light shielding layer 26 falls within the range 0.575 μm to 0.625 μm, when the angle of incidence θ1 of the incident light falls within a range of 7° to 10°, when the F number of the projection lens 117 falls within a range of 1.7 to 2.2, the efficiency for light utilization is higher in the case of the liquid crystal device 1 provided with the prisms 15 of the present embodiment. Note that, while it is not obvious from FIGS. 6A to 7D, since the width W1 of the light shielding layer 26 is narrower, the efficiency for light utilization is slightly higher in example 1 than in example 2.

Here, description will be given of the differences between the effects of the prisms and the micro lenses with reference to FIGS. 8A and 8B. FIGS. 8A and 8B are schematic views illustrating a comparison of the effects of a prism and a micro lens. Specifically, FIG. 8A is a schematic view illustrating the optical path of incident light Lp which is incident on the liquid crystal device 1 provided with the prisms 15, and FIG. 8B is a schematic view illustrating the optical path of the incident light Lp which is incident on the liquid crystal device 1A which is provided with the micro lenses 17. In FIGS. 8A and 8B, the incident light Lp is parallel light, which is parallel to the normal line direction of the surface (the surface 11b of the substrate 11) of the opposing substrate 30.

As illustrated in FIG. 8A, in the liquid crystal device 1 provided with the prism 15, the incident light Lp which is incident on a region which does not overlap the prism 15 in plan view proceeds directly as it is, passes through the liquid crystal layer 40, and is emitted from the element substrate 20. The incident light Lp which is incident on a region which overlaps the prism 15 in plan view at the peripheral edge portion of the opening region D1 is reflected by the prism 15, and proceeds inclined in relation to the normal line direction of the surface of the opposing substrate 30. Accordingly, it is possible to direct the incident light Lp, which will be blocked by the light shielding layer 26 if the incident light Lp proceeds directly as it is, toward the opening region D1.

Meanwhile, as illustrated in FIG. 8B, in the liquid crystal device 1A provided with the substantially semispherical micro lens 17, the incident light Lp which is incident on the micro lens 17, except for portion of the incident light Lp that is incident on the planar center of the micro lens 17, is concentrated toward the focal point of the micro lens 17 and proceeds inclined at various angles in relation to the normal line direction of the surface of the opposing substrate 30. Accordingly, it is possible to direct the incident light Lp, which will be blocked by the light shielding layer 26 if the incident light Lp proceeds directly as it is, toward the opening region D1.

Note that, FIG. 8B illustrates an example of a case in which, in the liquid crystal device 1A, the micro lens 17 is substantially semispherical and the incident light Lp is concentrated on one focal point; however, there are also semi-ellipsoid micro lenses and non-semispherical micro lenses including a planar portion or a tapered portion. In the semi-ellipsoid or non-semispherical micro lens, the incident light Lp is not concentrated on one point.

In the liquid crystal device 1 illustrated in FIG. 8A, in comparison with the liquid crystal device 1A illustrated in FIG. 8B, the amount of light which is blocked by the light shielding layer 26 increases when the width W1 of the light shielding layer 26 increases. According to examples 1 and 2 described above, if the width W1 of the light shielding layer 26 at least falls within a range of 0.575 μm to 0.625 μm, a large difference is not observed between the liquid crystal device 1 and the liquid crystal device 1A; however, it is estimated that when the width W1 of the light shielding layer 26 further increases, more light is likely to be blocked by the light shielding layer 26 and the decrease in efficiency for light utilization will be greater in the liquid crystal device 1 than in the liquid crystal device 1A.

Meanwhile, in the liquid crystal device 1A illustrated in FIG. 8B, in comparison with the liquid crystal device 1 illustrated in FIG. 8A, of the incident light Lp, the amount of light which is inclined at various angles increases and the inclination angle thereof also increases due to the light concentration effect of the micro lens 17. Therefore, in the liquid crystal device 1A, the dispersion of the angles of the light which is incident on the liquid crystal layer 40 increases, and the inclination angle in relation to the optical axis of the projection lens 117 also increases.

As described above, the greater the F number of the projection lens 117 is, the smaller the acceptance angle θ becomes. For example, when the F number is 1.4, the acceptance angle θ is 20.9°; however, when the F number is 1.7, the acceptance angle θ decreases to approximately 17.1°, and when the F number is 1.8, the acceptance angle θ further decreases to approximately 16.1°. Therefore, in the liquid crystal device 1A illustrated in FIG. 8B, in comparison with the liquid crystal device 1 illustrated in FIG. 8A, since when the F number of the projection lens 117 is 1.7 or greater, the amount of light which relatively exceeds the acceptance angle θ and is subjected to vignetting increases, the efficiency for light utilization is considered to decrease.

In the liquid crystal device 1A illustrated in FIG. 8B, in comparison with the liquid crystal device 1 illustrated in FIG. 8A, since the dispersion of the inclination angles of the light which passes through the liquid crystal layer 40 in relation to the alignment direction of the liquid crystal molecules increases, the contrast of the displayed image decreases. Therefore, the liquid crystal device 1 provided with the prisms 15 has a higher contrast than the liquid crystal device 1A provided with the micro lenses 17.

In this manner, when the projection lens 117 with an F number of 1.7 or greater is used in the short-focus projector 100, in the liquid crystal device 1 provided with the prisms 15, under predetermined conditions it is possible to suppress the amount of light of an inclination angle that exceeds the acceptance angle θ of the projection lens 117 to less than in the liquid crystal device 1A while suppressing the amount of light which is blocked by the light shielding layer 26 to a small amount. Accordingly, in the projector 100 according to the present embodiment, it is possible to reduce the amount of light which is subjected to vignetting by the projection lens 117 to less than in the liquid crystal device 1A provided with the micro lenses 17 while increasing the efficiency for light utilization in the liquid crystal device 1 provided with the prisms 15; thus, it is possible to obtain a brighter image.

Manufacturing Method of Prism Substrate

Next, description will be given of the manufacturing method of the prism substrate 10 according to the present embodiment, with reference to FIGS. 9A to 10C. FIGS. 9A to 10C are schematic cross-sectional diagrams illustrating a manufacturing method of the prism substrate according to the present embodiment. Note that each of the drawings in FIGS. 9A to 10C is equivalent to a cross-sectional view along the line V-V of FIG. 4. Each of FIGS. 9A to 10C is vertically inverted in the Z direction in relation to FIG. 5.

Figure 9A:
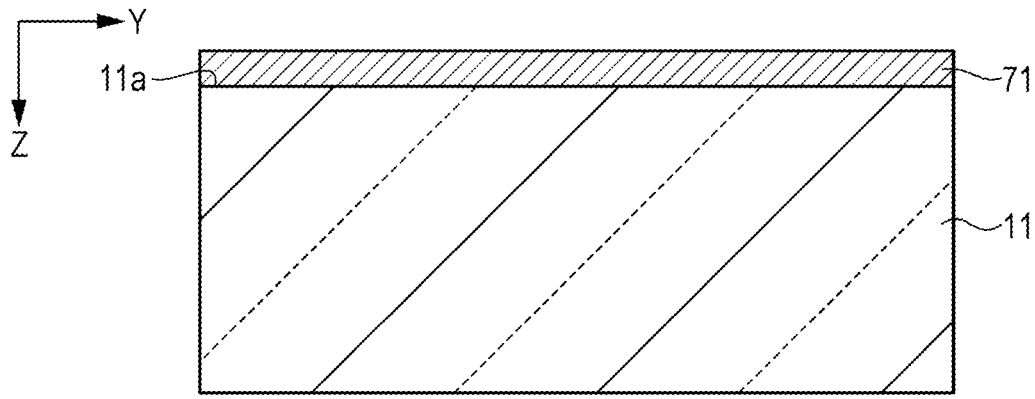
FIGS. 9A to 9C are schematic cross-sectional diagrams illustrating a manufacturing method of a prism substrate according to the present embodiment.

First, as illustrated in FIG. 9A, a mask layer 71 is formed on the surface 11a of the substrate 11 which is formed of quarts or the like and has optical transparency. Since the groove 12 will be formed in the etching process described later such that the depth H to width W2 ratio of the opening portion 12c is large, a hard mask formed of a metal material such as W (tungsten), or WSi (tungsten silicide), for example, can be favorably used as the mask layer 71. The material of the mask layer 71 may be Al (aluminum), Fe (iron), Ni (nickel), Si (silicon), or the like.

Figure 9B:
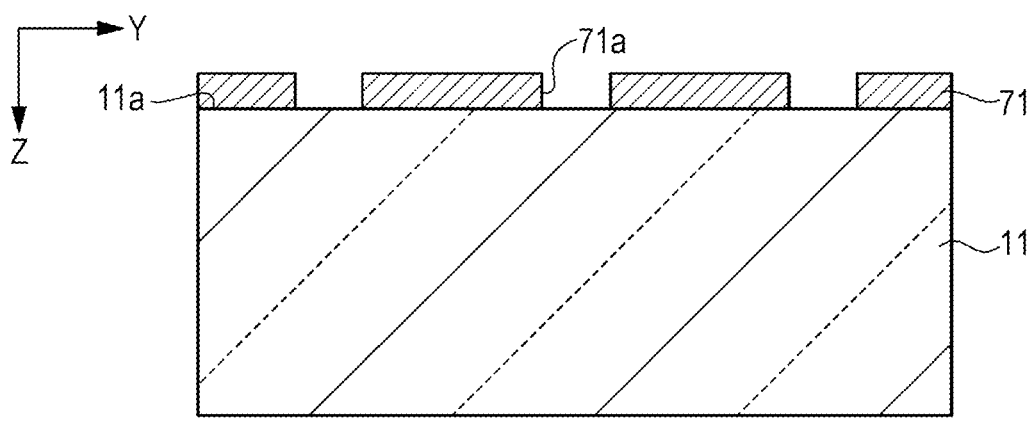

Next, as illustrated in FIG. 9B, the opening portion 71a is formed in the mask layer 71 using photolithography technology. The opening portion 71a is formed to overlap the light shielding region D2 illustrated in FIG. 4 in plan view. Accordingly, the surface 11a of the substrate 11 is exposed in the opening portion 71a.

Figure 9C:
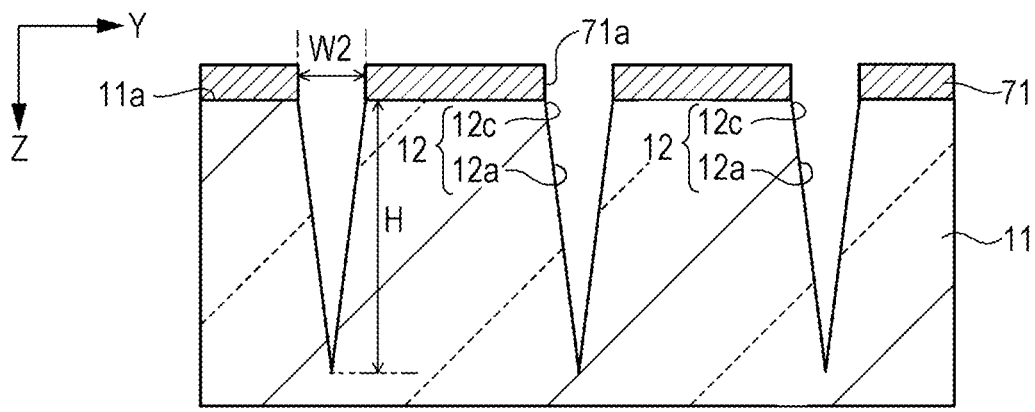

Next, the substrate 11 is subjected to an etching process via the opening portion 71a of the mask layer 71. Accordingly, as illustrated in FIG. 9C, the groove 12, which has the opening portion 12c and the inclined surfaces 12a, is formed on the surface 11a side of the substrate 11. It is possible to use a dry etching process, which uses an Inductive Coupled Plasma-RIE (ICP-RIE) dry etching device which is capable of forming high density plasma, for example, as the etching process.

The dry etching process is performed in a reduced-pressure environment inside the dry etching device. A gas in which oxygen, carbon monoxide or the like is mixed with a fluorine-based gas is used as the etching gas. For example, when the etching selectivity between the substrate 11 and the mask layer 71 is set to greater than or equal to 4:1, it is possible to form the cross-sectionally V-shaped groove 12 which has a depth of four or more times the thickness of the mask layer 71. Accordingly, the groove 12, in which the ratio of the depth H to the width W2 of the opening portion 12c is great, is formed.

Figure 10A:
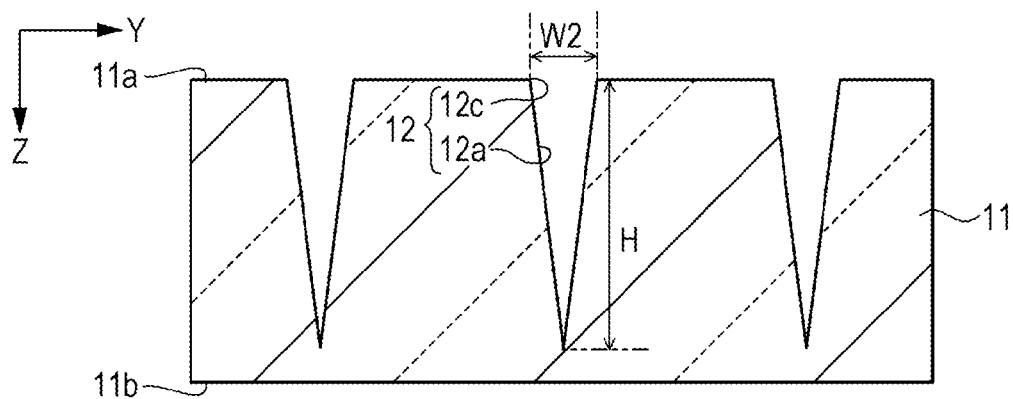
FIGS. 10A to 10C are schematic cross-sectional diagrams illustrating a manufacturing method of the prism substrate according to the present embodiment.

Next, as illustrated in FIG. 10A, the mask layer 71 is removed from the substrate 11 in which the groove 12, which has the opening portion 12c and the inclined surfaces 12a, is formed. Note that, in the etching process in which the groove 12 is formed, it is possible to set the width W2 and the depth H of the groove 12 to desired values by adjusting the material of the mask layer 71 or the etching conditions in the etching process, as appropriate.

Figure 10B:
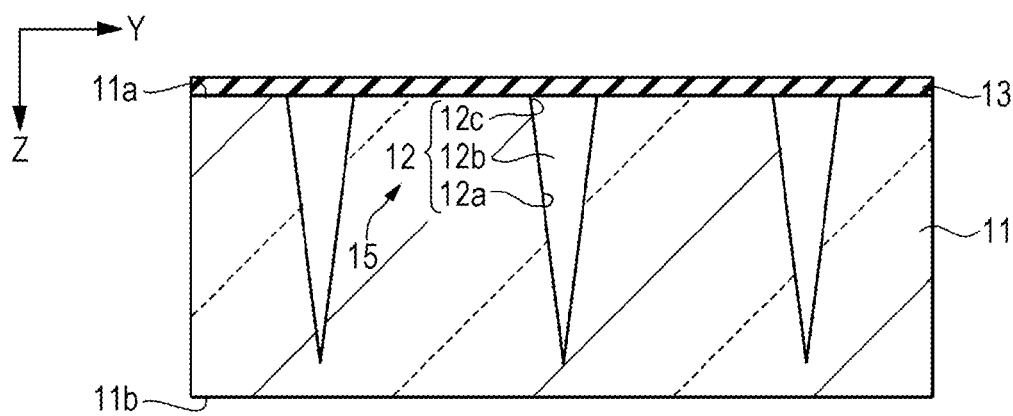

Next, as illustrated in FIG. 10B, the first sealing layer 13 is formed to cover the surface 11a of the substrate 11 and to block the opening portion 12c of the groove 12. The first sealing layer 13 is formed by depositing a silicon oxide film using a film forming method with poor level difference coverage such as a plasma CVD method using silane, for example. The first sealing layer 13 may be formed to enter the inner portion of the groove 12 slightly from the opening portion 12c.

Accordingly, the opening portion 12c of the groove 12 is blocked by the first sealing layer 13, and the vacant portion 12b is formed by the inner portion of the groove 12 being sealed in a vacant state. The vacant portion 12b is sealed in the atmospheric state when the first sealing layer 13 is formed. As a result, the prism 15 is formed on the substrate 11.

Figure 10C:
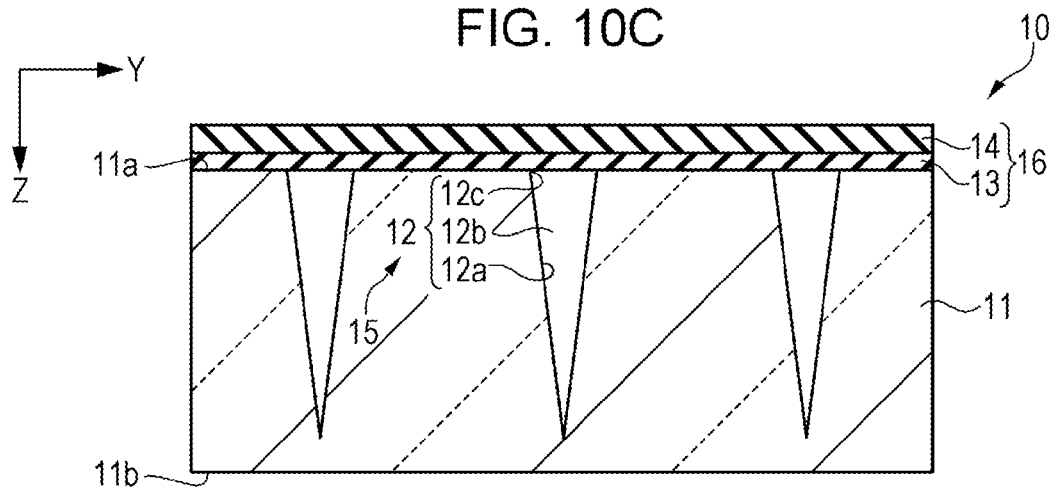

Next, as illustrated in FIG. 10C, the second sealing layer 14 is formed so as to cover the first sealing layer 13. The second sealing layer 14 is formed by depositing a silicon oxide film using a film forming method with excellent level difference coverage such as a plasma CVD method using TEOS (tetraethoxysilane: $Si(OC_2H_5)_4$), for example. Next, the surface of the second sealing layer 14 which is formed is planarized using a chemical mechanical polishing (CMP) method. As a result, the sealing layer 16 is formed of a laminate of the first sealing layer 13 and the second sealing layer 14, and the prism substrate 10 is completed.

Note that, when the opening portion 12c of the groove 12 cannot be blocked by only depositing the material of the first sealing layer 13, silicon or the like may be deposited so as to fill the inner portion of the groove 12 as a sacrificial layer, and the first sealing layer 13 may be formed thereon. In such a case, opening portions with smaller diameters than the width W2 of the grooves 12 are provided in the first sealing layer 13 in positions which overlap the intersections of the grooves 12 which are formed in a lattice pattern in plan view, and the sacrificial layer in the inner portions of the grooves 12 are removed from the opening portions using selective etching. It is possible to form the vacant portions 12b by sealing the inner portions of the grooves 12 in a vacant state by blocking the opening portions of the first sealing layer 13 with the second sealing layer 14, which is formed to cover the first sealing layer 13.

After the prism substrate 10 is completed, as illustrated in FIG. 5, the opposing substrate 30 is obtained by sequentially forming the light shielding layer 32 (refer to FIG. 1), the inter-layer layer 33, the common electrode 34, and the alignment layer 35 on the second sealing layer 14, with the prism substrate 10 as the base material. It is possible to use well-known technology for each of the processes used to manufacture the opposing substrate 30.

The embodiments described above merely describe a mode of the invention, and may be modified and put to practical use arbitrarily within the scope of the invention. Modification examples such as those described hereinafter may be considered.

Modification Example 1

In the embodiments described above, the liquid crystal device 1 may be configured such that the prism substrate 10 is provided in the opposing substrate 30; however, the invention is not limited to such an embodiment. The liquid crystal device 1 may be configured such that the prism substrate 10 is provided in the element substrate 20. However, when the prism substrate 10 is provided in the element substrate 20, the prisms 15 and the light shielding portions 6 are provided in the element substrate 20, and the liquid crystal layer 40 is not interposed therebetween; thus, the distance between the prisms 15 and the light shielding layer 26 differs from in the embodiments described above. Therefore, there is a case in which the F number of the projection lens at which the efficiency for light utilization is high differs from the ranges described above.

Modification Example 2

In the electronic apparatus (the projector 100) of the embodiments described above, three liquid crystal light bulbs 121, 122, and 123 to which the liquid crystal device 1 is applies are provided; however, the invention is not limited to such an embodiment. A configuration may be adopted in which the electronic apparatus is provided with two or less liquid crystal light bulbs (the liquid crystal device 1), and a configuration may be adopted in which the electronic apparatus is provided with four or more liquid crystal light bulbs (the liquid crystal device 1).

The entire disclosure of Japanese Patent Application No. 2013-225047, filed Oct. 30, 2013 is expressly incorporated by reference herein.

What is claimed is:

1. An electronic apparatus, comprising:
a light source unit which supplies light;
an electro-optical device which modulates the light which is incident from the light source unit; and
a projection lens which projects the light which is modulated by the electro-optical device,
wherein the electro-optical device is provided with
a first substrate which includes a plurality of pixel electrodes and a light shielding layer which is disposed between two adjacent pixel electrodes of the plurality of pixel electrodes;
a second substrate which is disposed to oppose the first substrate and includes grooves which are disposed at positions overlapping the light shielding layer in plan view; and
an electro-optical material layer which is provided between the first substrate and the second substrate,
wherein the grooves include inclined surfaces which are inclined in relation to a surface of the second substrate such that a width of opening portions of the grooves is wider at the first substrate side, and
wherein a width of the light shielding layer falls within a range of 0.575 μm to 0.625 μm, and when an angle of incidence of the light which is incident on the electro-optical device from the light source unit falls within a range of 7° to 17°, an F number of the projection lens falls within a range of 1.8 to 2.2.

2. The electronic apparatus according to claim 1,
wherein the second substrate includes a sealing layer which covers a surface opposing the first substrate and blocks the opening portions of the grooves, and
wherein a depth of the grooves falls within a range of 25 μm to 35 μm,
a width of the opening portions of the grooves falls within a range of 0.7 μm to 3.0 μm,
a thickness of the sealing layer falls within a range of 2 μm to 5 μm,
a thickness of the electro-optical material layer falls within a range of 2 μm to 4 μm, and
a thickness of the light shielding layer falls within a range of 2 μm to 5 μm.

3. An electro-optical device used in the electronic apparatus according to claim 2.

4. An electro-optical device used in the electronic apparatus according to claim 1.

5. An electronic apparatus, comprising:
a light source unit which supplies light;
an electro-optical device which modulates the light which is incident from the light source unit; and
a projection lens which projects the light which is modulated by the electro-optical device,
wherein the electro-optical device is provided with
a first substrate which includes a plurality of pixel electrodes and a light shielding layer which is disposed between two adjacent pixel electrodes of the plurality of pixel electrodes;

a second substrate which is disposed to oppose the first substrate and includes grooves which are disposed at positions overlapping the light shielding layer in plan view; and an electro-optical material layer which is provided between the first substrate and the second substrate, wherein the grooves include inclined surfaces which are inclined in relation to a surface of the second substrate such that a width of opening portions of the grooves is wider at the first substrate side, and wherein a width of the light shielding layer falls within a range of 0.575 µm to 0.625 µm, and when an angle of incidence of the light which is incident on the electro-optical device from the light source unit falls within a range of 7° to 10°, an F number of the projection lens falls within a range of 1.7 to 2.2.

6. An electro-optical device used in the electronic apparatus according to claim 5.

\* \* \* \* \*